(12) United States Patent
Matsuoka et al.

(10) Patent No.: US 8,994,642 B2
(45) Date of Patent: Mar. 31, 2015

(54) DISPLAY ELEMENT AND ELECTRIC DEVICE USING SAME

(75) Inventors: Toshiki Matsuoka, Osaka (JP); Kohzoh Nakamura, Osaka (JP); Shun Ueki, Osaka (JP); Takuma Tomotoshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 231 days.

(21) Appl. No.: 13/696,658

(22) PCT Filed: Jan. 14, 2011

(86) PCT No.: PCT/JP2011/050537
§ 371 (c)(1),
(2), (4) Date: Nov. 7, 2012

(87) PCT Pub. No.: WO2011/138875
PCT Pub. Date: Nov. 10, 2011

(65) Prior Publication Data
US 2013/0057455 A1    Mar. 7, 2013

(30) Foreign Application Priority Data
May 7, 2010 (JP) ................................. 2010-107660

(51) Int. Cl.
*G02B 26/00* (2006.01)
*G09G 3/34* (2006.01)

(52) U.S. Cl.
CPC .................. *G09G 3/348* (2013.01); *G09G 3/34* (2013.01); *G02B 26/005* (2013.01)
USPC .......................................... 345/107; 359/228

(58) Field of Classification Search
CPC .. G02B 26/026; G02B 26/005; G02B 26/004; G02B 2207/115; G02F 1/167; G02F 1/172; G09G 3/348

USPC .................................... 345/107; 359/296, 228
See application file for complete search history.

(56) References Cited

U.S. PATENT DOCUMENTS 7,259,744 B2 * 8/2007 Arango et al. ................ 345/107
7,834,843 B2   11/2010 Karaki (Continued)

FOREIGN PATENT DOCUMENTS

| JP | 2006-47671 | 2/2006 |
| JP | 2009-128448 | 6/2009 |
| JP | 2009-151244 | 7/2009 |

OTHER PUBLICATIONS

English translation of Written Opinion, Feb. 15, 2011, PCT/JP2011/050537.*

(Continued)

*Primary Examiner* — Julie Anne Watko
(74) *Attorney, Agent, or Firm* — Nixon & Vanderhye P.C.

(57) ABSTRACT

A display element (10) includes an upper substrate (first substrate) (2), a lower substrate (second substrate) (3), and a polar liquid (16) that is sealed in a display space (S) formed between the upper substrate (2) and the lower substrate (3) so as to be moved toward an effective display region (P1) or a non-effective display region (P2). A display control (DC) supplies predetermined reset signals to signal electrodes (4), reference electrodes (5), and scanning electrodes (6) so that the polar liquid (16) in each of all pixel regions (P) is moved to an initial position that is set on the effective display region (P1) side or the non-effective display region (P2) side opposite the scanning direction before the scanning operation is performed.

12 Claims, 16 Drawing Sheets

(56) References Cited

U.S. PATENT DOCUMENTS

| | | | |
|---|---|---|---|
| 8,115,709 B2* | 2/2012 | Cheng et al. | 345/84 |
| 8,154,486 B2* | 4/2012 | Feenstra et al. | 345/84 |
| 2007/0285347 A1* | 12/2007 | Karaki | 345/30 |
| 2008/0278434 A1* | 11/2008 | Van Dijk et al. | 345/107 |
| 2009/0034054 A1* | 2/2009 | Ikegami et al. | 359/296 |
| 2010/0177022 A1 | 7/2010 | Teranishi et al. | |
| 2011/0134167 A1 | 6/2011 | Yamamoto | |
| 2013/0278994 A1* | 10/2013 | Feil | 359/296 |

OTHER PUBLICATIONS

International Search Report for PCT/JP2011/050537, mailed Feb. 15, 2011.

* cited by examiner

DISPLAY ELEMENT AND ELECTRIC DEVICE USING SAME

This application is the U.S. national phase of International Application No. PCT/JP2011/050537 filed 14 Jan. 2011 which designated the U.S. and claims priority to JP 2010-107660 filed 7 May 2010, the entire contents of each of which are hereby incorporated by reference.

TECHNICAL FIELD

The present invention relates to a display element that displays information such as images and characters by moving a polar liquid, and an electric device using the display element.

BACKGROUND ART

In recent years, as typified by an electrowetting type display element, a display element that displays information by utilizing a transfer phenomenon of a polar liquid due to an external electric field has been developed and put to practical use.

Specifically, in such a conventional display element, a display space is formed between first and second substrates, and the inside of the display space is divided by ribs (partitions) in accordance with a plurality of pixel regions (see, e.g., Patent Document 1). Moreover, a conductive liquid (polar liquid) is sealed in each of the pixel regions, and signal electrodes are arranged so as to cross scanning electrodes and standard electrodes (reference electrodes) that are parallel to each other. In this conventional display element, voltages are appropriately applied to the signal electrodes, the scanning electrodes, and the standard electrodes, so that the conductive liquid is moved to the scanning electrode side or the standard electrode side in each of the pixel regions, thereby changing the display color on a display surface.

PRIOR ART DOCUMENTS

Patent Documents

Patent Document 1: WO 2008/155925 A1

DISCLOSURE OF INVENTION

Problem to be Solved by the Invention

In the above conventional display element, the amount of the movement of the conductive liquid is changed by adjusting the magnitude of the voltage applied to the signal electrodes, and thus the display color on the display surface is turned into a halftone, i.e., so-called gradation display is performed.

However, in the conventional display element, there is a possibility that the display color cannot be changed with high precision. In particular, when the gradation display is performed, the conductive liquid cannot be moved precisely to a desired position, and a subtle color shift occurs, which may result in low display quality.

Specifically, in the conventional display element, each of the pixel regions is not fully enclosed by the ribs in order to improve the speed of the movement of the conductive liquid inside the pixel region. For example, in the case of a rectangular pixel region, clearances through which the adjacent pixel regions can communicate with each other are provided in four corners of the pixel region. Moreover, an oil (insulating fluid) that is not mixed with the conductive liquid is movably sealed in each of the pixel regions to improve the speed of the movement of the conductive liquid. Therefore, in the conventional display element, depending on the size of the clearances, the materials of the conductive liquid and the oil, the speed of the movement of the conductive liquid, etc., the conductive liquid may be slightly moved due to the oil that has flowed from the adjacent pixel regions.

Moreover, when the next display operation is performed while the conductive liquid is slightly moved as described above, the conductive liquid may not be moved precisely to the position where it is to be located in the next display operation, even if a voltage corresponding to that display operation is properly applied to the signal electrodes. Consequently, the conventional display element may cause a subtle color shift and reduce the display quality.

With the foregoing in mind, it is an object of the present invention to provide a display element that can prevent a reduction in the display quality even if gradation display is performed, and an electric device using the display element.

Means for Solving Problem

To achieve the above object, a display element of the present invention includes the following: a first substrate provided on a display surface side; a second substrate provided on a non-display surface side of the first substrate so that a predetermined display space is formed between the first substrate and the second substrate; an effective display region and a non-effective display region that are defined with respect to the display space; and a polar liquid sealed in the display space so as to be moved toward the effective display region or the non-effective display region. The display element is capable of changing a display color on the display surface side by moving the polar liquid. The display element includes the following: a plurality of signal electrodes that are placed in the display space so as to come into contact with the polar liquid, and are also provided along a predetermined arrangement direction; a plurality of reference electrodes that are provided on one of the first substrate and the second substrate so as to be electrically insulated from the polar liquid and to be located on one of the effective display region side and the non-effective display region side, and are also arranged so as to intersect with the plurality of the signal electrodes; a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes; a plurality of pixel regions that are located at each of the intersections of the plurality of the signal electrodes and the plurality of the scanning electrodes; ribs that are provided on at least one of the first substrate and the second substrate so as to partition the inside of the display space in accordance with each of the plurality of the pixel regions; an insulating fluid that is not mixed with the polar liquid and is movably sealed in the display space; and a display control that performs drive control of the plurality of the signal electrodes, the plurality of the reference electrodes, and the plurality of the scanning electrodes so that a scanning operation is performed along a predetermined scanning direction based on an external image input signal. The effective display region and the non-effective display region are set along the scanning direction in each of the plurality of the pixel regions. The display control supplies predetermined reset signals to the signal electrodes, the reference electrodes, and the scanning electrodes so that the polar liquid in each of all the pixel regions is moved to an initial position that is set on the effective display region side or the non-effective display region side opposite the scanning direction before the scanning operation is performed.

In the display element having the above configuration, the display control supplies the predetermined reset signals to the signal electrodes, the reference electrodes, and the scanning electrodes so that the polar liquid in each of all the pixel regions is moved to the initial position that is set on the effective display region side or the non-effective display region side opposite the scanning direction before the scanning operation is performed. Thus, since the polar liquid in each of all the pixel regions can be moved to the initial position before the scanning operation is performed, the polar liquid can be moved precisely to the desired position in the next display operation. Consequently, unlike the conventional example, the display element can prevent a reduction in the display quality even if the gradation display is performed.

In the above display element, it is preferable that the display control supplies predetermined pre-signals to the signal electrodes, the reference electrodes, and the scanning electrodes so that the polar liquid in each of the pixel regions to be scanned is held on the initial position side when the scanning operation is performed.

In this case, the polar liquid in each of the pixel regions to be scanned can be held on the initial position side by the pre-signals. Therefore, a reduction in the display quality can be reliably prevented even if the gradation display is performed.

It is preferable that the above display element includes the following: a signal voltage application portion that is connected to the plurality of the signal electrodes and the display control, and applies a signal voltage in a predetermined voltage range in accordance with information to be displayed on the display surface side, a voltage of the reset signal, and a voltage of the pre-signal to each of the plurality of the signal electrodes based on an instruction signal from the display control; a reference voltage application portion that is connected to the plurality of the reference electrodes and the display control, and applies one of a selected voltage and a non-selected voltage, the selected voltage allowing the polar liquid to move in the display space in accordance with the signal voltage and the non-selected voltage inhibiting a movement of the polar liquid in the display space, a voltage of the reset signal, and a voltage of the pre-signal to each of the plurality of the reference electrodes; and a scanning voltage application portion that is connected to the plurality of the scanning electrodes and the display control, and applies one of a selected voltage and a non-selected voltage, the selected voltage allowing the polar liquid to move in the display space in accordance with the signal voltage and the non-selected voltage inhibiting a movement of the polar liquid in the display space, a voltage of the reset signal, and a voltage of the pre-signal to each of the plurality of the scanning electrodes.

In this case, a matrix-driven display element with excellent display quality can be easily provided.

In the above display element, the display control may include a reset signal instruction portion that selects the maximum voltage or the minimum voltage of the signal voltage as a voltage of the reset signal to be applied to the signal electrodes, that selects the selected voltage or the non-selected voltage as a voltage of the reset signal to be applied to the reference electrodes, and that selects the selected voltage or the non-selected voltage as a voltage of the reset signal to be applied to the scanning electrodes.

In this case, the same voltages can be used for both the voltages applied in the scanning operation and the voltages of the reset signals. Therefore the configuration of each of the signal voltage application portion, the reference voltage application portion, and the scanning voltage application portion can be simplified.

In the above display element, the display control may supply predetermined pre-signals to the signal electrodes, the reference electrodes, and the scanning electrodes so that the polar liquid in each of a plurality of the pixel regions to be scanned is held on the initial position side at the same time when the scanning operation is performed.

In this case, the polar liquid in each of a plurality of the pixel regions can be held on the initial position side at the same time. Therefore, the configuration of the display control can be simplified.

In the above display element, the display control may include a pre-signal instruction portion that selects the maximum voltage or the minimum voltage of the signal voltage as a voltage of the pre-signal to be applied to the signal electrodes, that selects the selected voltage or the non-selected voltage as a voltage of the pre-signal to be applied to the reference electrodes, and that selects the selected voltage or the non-selected voltage as a voltage of the pre-signal to be applied to the scanning electrodes.

In this case, the same voltages can be used for both the voltages applied in the scanning operation and the voltages of the pre-signals. Therefore the configuration of each of the signal voltage application portion, the reference voltage application portion, and the scanning voltage application portion can be simplified.

In the above display element, the display control may include a pre-signal time setting portion for setting an application time of the pre-signals to the signal electrodes, the reference electrodes, and the scanning electrodes, and the pre-signal instruction portion may use the application time set by the pre-signal time setting portion to select a voltage of the pre-signal to be applied to the signal electrodes, a voltage of the pre-signal to be applied to the reference electrodes, and a voltage of the pre-signal to be applied to the scanning electrodes.

In this case, the voltages of the pre-signals to be applied are changed by adjusting the application time of the pre-signals, so that even the speed of the movement of the polar liquid can be controlled by those pre-signals. Consequently, it is possible to suppress the effect of the movement of the polar liquid on the adjacent pixel regions due to the pre-signals. Therefore, high resolution gradation display can be easily performed.

In the above display element, the display control may supply predetermined pre-signals to the signal electrodes, the reference electrodes, and the scanning electrodes so that the polar liquid in each of a plurality of the pixel regions to be scanned is held on the initial position side for each pixel region when the scanning operation is performed.

In this case, the polar liquid can be moved precisely in each of the pixel regions, and the display element can have excellent display quality.

In the above display element, the display control may include a pre-signal determination portion that determines the amount of displacement of the polar liquid due to at least the first previous scanning operation in each of the pixel regions to be scanned when the scanning operation is performed, and that also uses the amount of displacement thus obtained to determine a voltage and an application time of the pre-signal to be applied to the signal electrodes, a voltage and an application time of the pre-signal to be applied to the reference electrodes, and a voltage and an application time of the pre-signal to be applied to the scanning electrodes.

In this case, the amount of displacement of the polar liquid due to at least the first previous scanning operation is determined. Therefore, the polar liquid can be moved more precisely toward the initial position side, and a reduction in the display quality can be prevented more reliably even if the gradation display is performed.

In the above display element, the pre-signal determination portion may use the amount of displacement thus obtained to determine a voltage and an application time of the pre-signal to be applied to the signal electrodes, a voltage and an application time of the pre-signal to be applied to the reference electrodes, and a voltage and an application time of the pre-signal to be applied to the scanning electrodes so that the polar liquid in each of the pixel regions to be scanned is held in the current position when the scanning operation is performed.

In this case, the voltages of the pre-signals can be applied during the scanning operation, and the polar liquid is not moved by the pre-signals. Therefore, it is possible to significantly suppress the adverse effect on the adjacent pixel regions in which the scanning operation has already been performed. Consequently, the speed of the display operation can be easily improved, and the display element with excellent display quality can be easily provided.

In the above display element, the plurality of the pixel regions may be provided in accordance with a plurality of colors that enable full-color display to be shown on the display surface side.

In this case, the color image display can be performed by moving the corresponding polar liquid properly in each of the pixels.

In the above display element, it is preferable that a dielectric layer is formed on the surfaces of the plurality of the reference electrodes and the plurality of the scanning electrodes.

In this case, the dielectric layer reliably increases the electric field applied to the polar liquid, so that the speed of the movement of the polar liquid can be more easily improved.

In the above display element, the non-effective display region may be defined by a light-shielding layer that is provided on one of the first substrate and the second substrate, and the effective display region may be defined by an aperture formed in the light-shielding layer.

In this case, the effective display region and the non-effective display region can be properly and reliably defined with respect to the display space.

An electric device of the present invention includes a display portion that displays information including characters and images. The display portion includes any of the above display elements.

In the electric device having the above configuration, the display portion uses the display element that can prevent a reduction in the display quality even if the gradation display is performed. Thus, a high-performance electric device including the display portion with excellent display quality can be easily provided.

Effects of the Invention

The present invention can provide a display element that can prevent a reduction in the display quality even if gradation display is performed, and an electric device using the display element.

DESCRIPTION OF THE INVENTION

Figure 1:
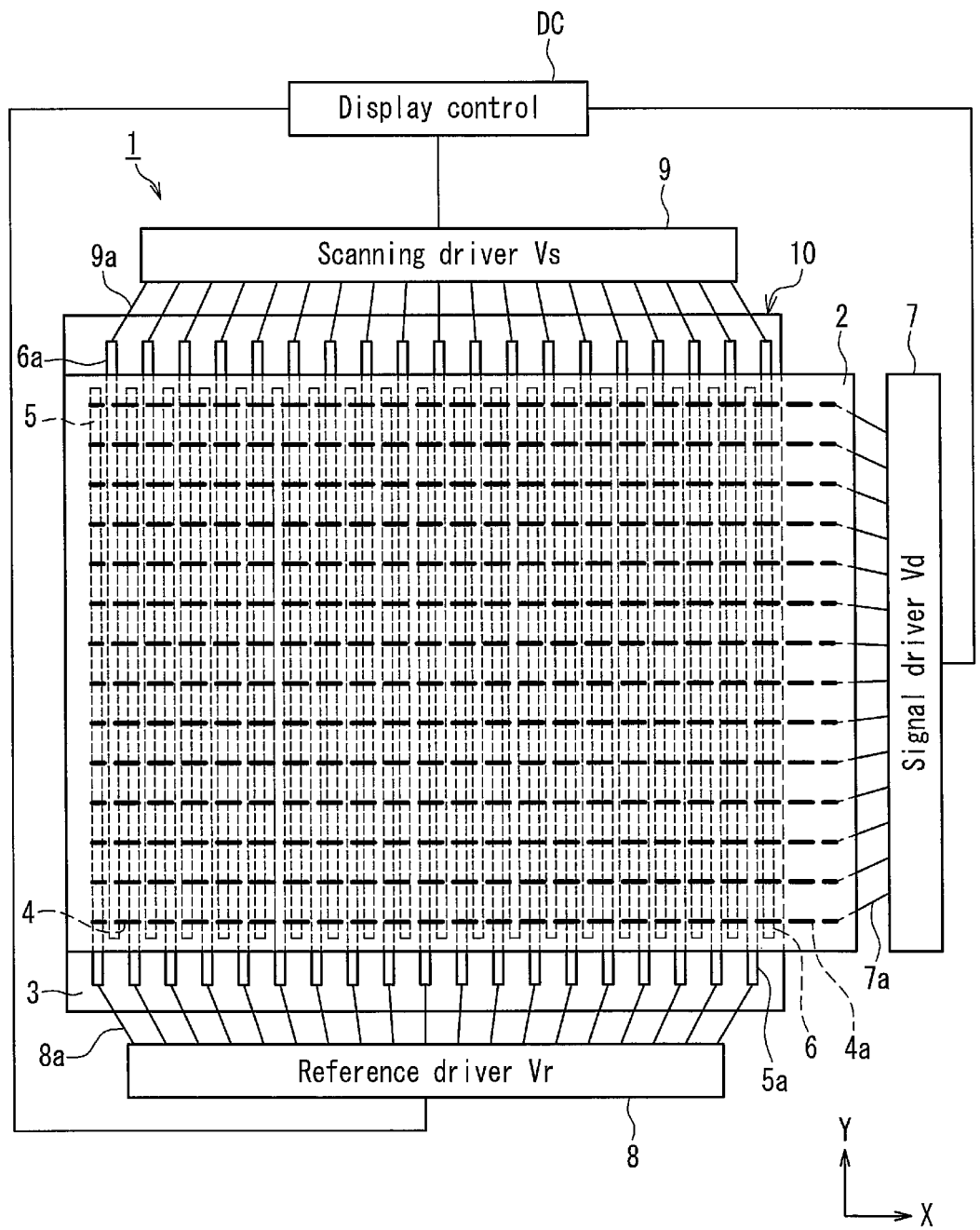
FIG. 1 is plan view for explaining a display element and an image display apparatus of Embodiment 1 of the present invention.

Hereinafter, preferred embodiments of a display element and an electric device of the present invention will be described with reference to the drawings. In the following description, the present invention is applied to an image display apparatus including a display portion that can display color images. The size and size ratio of each of the constituent members in the drawings do not exactly reflect those of the actual constituent members.

Embodiment 1

FIG. 1 is a plan view for explaining a display element and an image display apparatus of Embodiment 1 of the present invention. In FIG. 1, an image display apparatus 1 of this embodiment includes a display portion using a display element 10 of this embodiment. The display portion has a rectangular display surface. The display element 10 is provided with a display control DC, and a signal driver 7, a reference driver 8, and a scanning driver 9 that are connected to the display control DC. The display control DC performs drive control of each of the signal driver 7, the reference driver 8, and the scanning driver 9. The display control DC receives an external image input signal, produces instruction signals based on the image input signal, and then outputs the instruction signals to the signal driver 7, the reference driver 8, and the scanning driver 9, respectively. Thus, the display element 10 can display information including characters and images in accordance with the image input signal.

The display element 10 includes an upper substrate 2 and a lower substrate 3 that are arranged to overlap each other in a direction perpendicular to the sheet of FIG. 1. The overlap between the upper substrate 2 and the lower substrate 3 forms an effective display region of the display surface (as will be described in detail later).

In the display element 10, a plurality of signal electrodes 4 are spaced at predetermined intervals and arranged in stripes in the X direction. Moreover, in the display element 10, a plurality of reference electrodes 5 and a plurality of scanning electrodes 6 are alternately arranged in stripes in the Y direction. The plurality of the signal electrodes 4 intersect with the plurality of the reference electrodes 5 and the plurality of the scanning electrodes 6, and a plurality of pixel regions are located at each of the intersections of the signal electrodes 4 and the scanning electrodes 6.

The signal electrodes 4, the reference electrodes 5, and the scanning electrodes 6 are configured so that voltages can be independently applied to these electrodes, and the voltages fall in a predetermined voltage range between a High voltage (referred to as "H voltage" in the following) that serves as a first voltage and a Low voltage (referred to as "L voltage" in the following) that serves as a second voltage (as will be described in detail later).

In the display element 10, the pixel regions are separated from one another by partitions and provided in accordance with a plurality of colors that enable full-color display to be shown on the display surface, as will be described in detail later. The display element 10 changes the display color on the display surface by moving a polar liquid (as will be described later) for each of a plurality of pixels (display cells) arranged in a matrix using an electrowetting phenomenon.

One end of the signal electrodes 4, the reference electrodes 5, and the scanning electrodes 6 are extended to the outside of the effective display region of the display surface and form terminals 4a, 5a, and 6a, respectively.

The signal driver 7 is connected to the individual terminals 4a of the signal electrodes 4 via wires 7a. The signal driver 7 constitutes a signal voltage application portion. Based on the instruction signal from the display control DC, the signal driver 7 applies a signal voltage Vd to each of the signal electrodes 4 in accordance with information when the image display apparatus 1 displays the information including characters and images on the display surface.

Moreover, as will be described in detail later, based on the instruction signal from the display control DC, the signal driver 7 applies a voltage of a predetermined reset signal to each of the signal electrodes 4 after displaying the information for one frame and before displaying the next information (i.e., before performing a scanning operation as will be described later). Further, as will be described in detail later, based on the instruction signal from the display control DC, the signal driver 7 applies a voltage of a predetermined pre-signal to the signal electrodes 4 to be scanned when the scanning operation is performed.

The reference driver 8 is connected to the individual terminals 5a of the reference electrodes 5 via wires 8a. The reference driver 8 constitutes a reference voltage application portion. Based on the instruction signal from the display control DC, the reference driver 8 applies a reference voltage Vr to each of the reference electrodes 5 when the image display apparatus 1 displays the information including characters and images on the display surface.

Moreover, as will be described in detail later, based on the instruction signal from the display control DC, the reference driver 8 applies a voltage of a predetermined reset signal to each of the reference electrodes 5 after displaying the information for one frame and before displaying the next information (i.e., before performing a scanning operation as will be described later). Further, as will be described in detail later, based on the instruction signal from the display control DC, the reference driver 8 applies a voltage of a predetermined pre-signal to the reference electrodes 5 to be scanned when the scanning operation is performed.

The scanning driver 9 is connected to the individual terminals 6a of the scanning electrodes 6 via wires 9a. The scanning driver 9 constitutes a scanning voltage application portion. Based on the instruction signal from the display control DC, the scanning driver 9 applies a scanning voltage Vs to each of the scanning electrodes 6 when the image display apparatus 1 displays the information including characters and images on the display surface.

Moreover, as will be described in detail later, based on the instruction signal from the display control DC, the scanning driver 9 applies a voltage of a predetermined reset signal to each of the scanning electrodes 6 after displaying the information for one frame and before displaying the next information (i.e., before performing a scanning operation as will be described later). Further, as will be described in detail later, based on the instruction signal from the display control DC, the scanning driver 9 applies a voltage of a predetermined pre-signal to the scanning electrodes 6 to be scanned when the scanning operation is performed.

The scanning driver 9 applies either a non-selected voltage or a selected voltage to each of the scanning electrodes 6 as the scanning voltage Vs. The non-selected voltage inhibits the movement of the polar liquid and the selected voltage allows the polar liquid to move in accordance with the signal voltage Vd. Moreover, the reference driver 8 is operated with reference to the operation of the scanning driver 9. The reference driver 8 applies either the non-selected voltage that inhibits the movement of the polar liquid or the selected voltage that allows the polar liquid to move in accordance with the signal voltage Vd to each of the reference electrodes 5 as the reference voltage Vr.

In the image display apparatus 1, the scanning driver 9 applies the selected voltage to each of the scanning electrodes 6 in sequence, e.g., from the left to the right of FIG. 1, and the reference driver 8 applies the selected voltage to each of the reference electrodes 5 in sequence from the left to the right of FIG. 1 in synchronization with the operation of the scanning driver 9. Thus, the scanning driver 9 and the reference driver 8 perform their respective scanning operations for each line (as will be described in detail later).

The signal driver 7, the reference driver 8, and the scanning driver 9 include a direct-current power supply or an alternating-current power supply that supplies the signal voltage Vd, the reference voltage Vr, and the scanning voltage Vs, respectively.

The reference driver 8 switches the polarity of the reference voltage Vr at predetermined time intervals (e.g., 1 frame). Moreover, the scanning driver 9 switches the polarity of the scanning voltage Vs in accordance with the switching of the polarity of the reference voltage Vr. Thus, since the polarities of the reference voltage Vr and the scanning voltage Vs are switched at predetermined time intervals, the localization of charges in the reference electrodes 5 and the scanning electrodes 6 can be prevented, compared to the case where the voltages with the same polarity are always applied to the reference electrodes 5 and the scanning electrodes 6. Moreover, it is possible to prevent the adverse effects of a display failure (after-image phenomenon) and low reliability (a reduction in life) due to the localization of charges.

Next, the specific configuration of the display control DC of this embodiment will be described with reference to FIG. 2.

Figure 2:
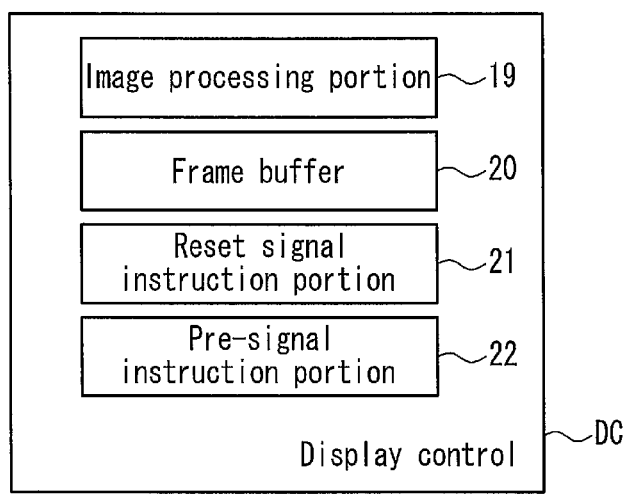
FIG. 2 is a block diagram showing the specific configuration of the display control in FIG. 1.

FIG. 2 is a block diagram showing the specific configuration of the display control in FIG. 1.

As shown in FIG. 2, the display control DC of this embodiment includes an image processing portion 19, a frame buffer 20, a reset signal instruction portion 21, and a pre-signal instruction portion 22. The display control DC is configured to supply the predetermined reset signals to the signal electrodes 4, the reference electrodes 5, and the scanning electrodes 6 so that the polar liquid in each of all the pixel regions is moved to the initial position that is set on the effective display region side opposite the scanning direction before the scanning operation is performed, as will be described in detail later. Moreover, the display control DC is configured to supply the predetermined pre-signals to the signal electrodes 4, the reference electrodes 5, and the scanning electrodes 6 so that the polar liquid in each of a plurality of the pixel regions to be scanned is held on the initial position side at the same time when the scanning operation is performed, as will be described in detail later.

The image processing portion 19 is configured to perform predetermined image processing on the external image input signal. Then, the image processing portion 19 produces instruction signals based on the results of the image processing, and outputs the instruction signals to the signal driver 7, the reference driver 8, and the scanning driver 9, respectively. Accordingly, the signal driver 7, the reference driver 8, and the scanning driver 9 output the signal voltage Vd, the reference voltage Vr, and the scanning voltage Vs, respectively, thereby displaying an image (information) corresponding to the image input signal on the display surface. The frame buffer 20 is configured to be able to store the image input signal data for at least one frame.

The reset signal instruction portion 21 instructs the signal driver 7, the reference driver 8, and the scanning driver 9 to apply the voltages of the predetermined reset signals after displaying the information for one frame and before performing the scanning operation in the next frame. Specifically, the reset signal instruction portion 21 selects the maximum voltage (i.e., the H voltage) or the minimum voltage (i.e., the L voltage) of the signal voltage Vd as a voltage of the reset signal to be applied to the signal electrodes 4, and then instructs the signal driver 7. Moreover, the reset signal instruction portion 21 selects the selected voltage or the non-selected voltage as a voltage of the reset signal to be applied to the reference electrodes 5, and then instructs the reference driver 8. Further, the reset signal instruction portion 21 selects the selected voltage or the non-selected voltage as a voltage of the reset signal to be applied to the scanning electrodes 6, and then instructs the scanning driver 9.

The pre-signal instruction portion 22 instructs the signal driver 7, the reference driver 8, and the scanning driver 9 to apply the voltages of the predetermined pre-signals when the scanning operation is performed. Specifically, the pre-signal instruction portion 22 selects the maximum voltage (i.e., the H voltage) or the minimum voltage (i.e., the L voltage) of the signal voltage Vd as a voltage of the pre-signal to be applied to the signal electrodes 4, and then instructs the signal driver 7. Moreover, the pre-signal instruction portion 22 selects the selected voltage or the non-selected voltage as a voltage of the pre-signal to be applied to the reference electrodes 5, and then instructs the reference driver 8. Further, the pre-signal instruction portion 22 selects the selected voltage or the non-selected voltage as a voltage of the pre-signal to be applied to the scanning electrodes 6, and then instructs the scanning driver 9.

The pixel structure of the display element 10 will be described in detail with reference to FIGS. 3 to 5 as well as FIG. 1.

Figure 3:
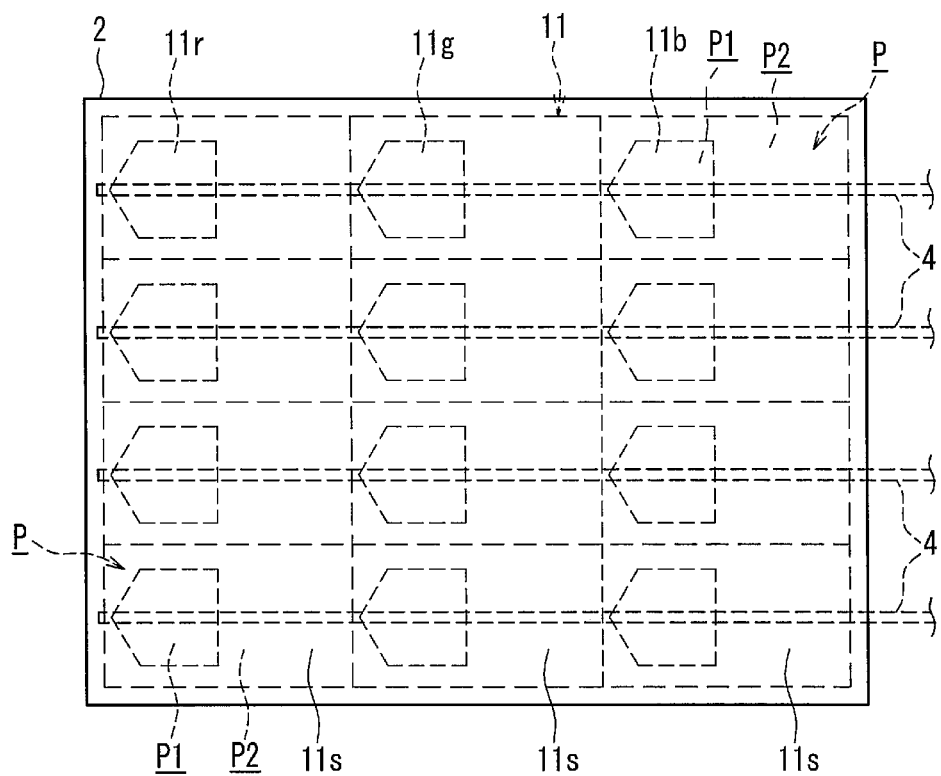
FIG. 3 is an enlarged plan view showing the main configuration of the upper substrate in FIG. 1 when viewed from a display surface side.

FIG. 3 is an enlarged plan view showing the main configuration of the upper substrate in FIG. 1 when viewed from the display surface side. FIG. 4 is an enlarged plan view showing the main configuration of the lower substrate in FIG. 1 when viewed from the non-display surface side. FIGS. 5A and 5B are cross-sectional views showing the main configuration of the display element in FIG. 1 during non-CF color display and CF color display, respectively. For the sake of simplification, FIGS. 3 and 4 show twelve pixels placed at the upper left corner of the plurality of pixels on the display surface in FIG. 1.

Figure 4:
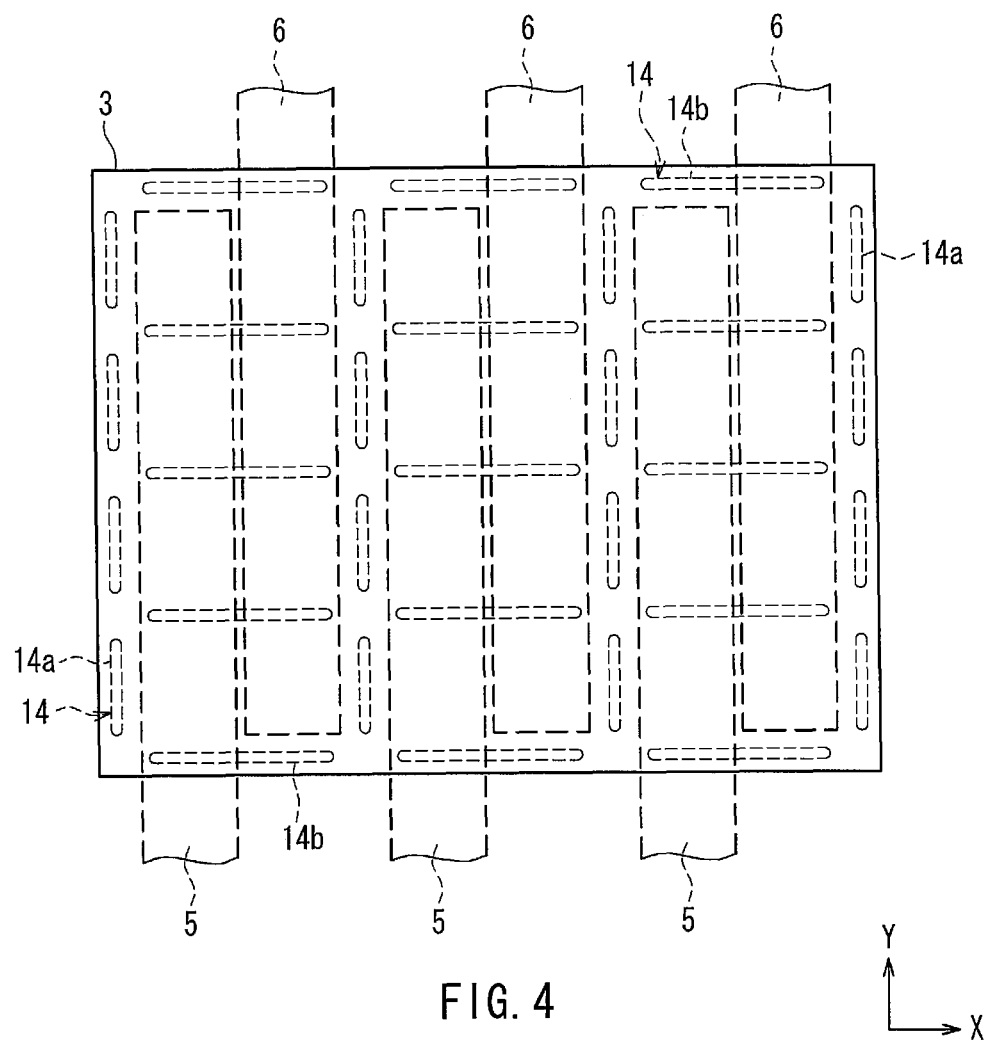
FIG. 4 is an enlarged plan view showing the main configuration of the lower substrate in FIG. 1 when viewed from a non-display surface side.
Figure 5A:
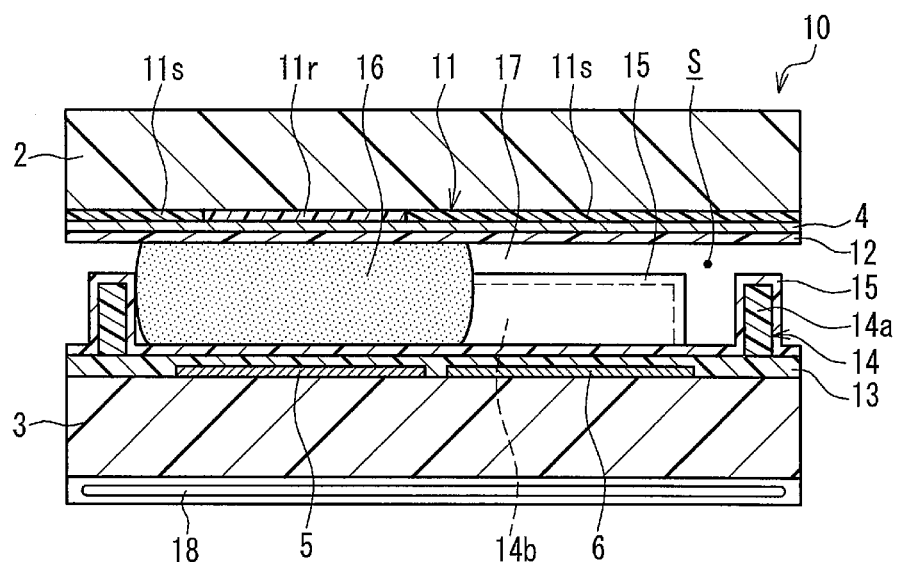
FIGS. 5A and 5B are cross-sectional views showing the main configuration of the display element in FIG. 1 during non-CF color display and CF color display, respectively.
Figure 5B:
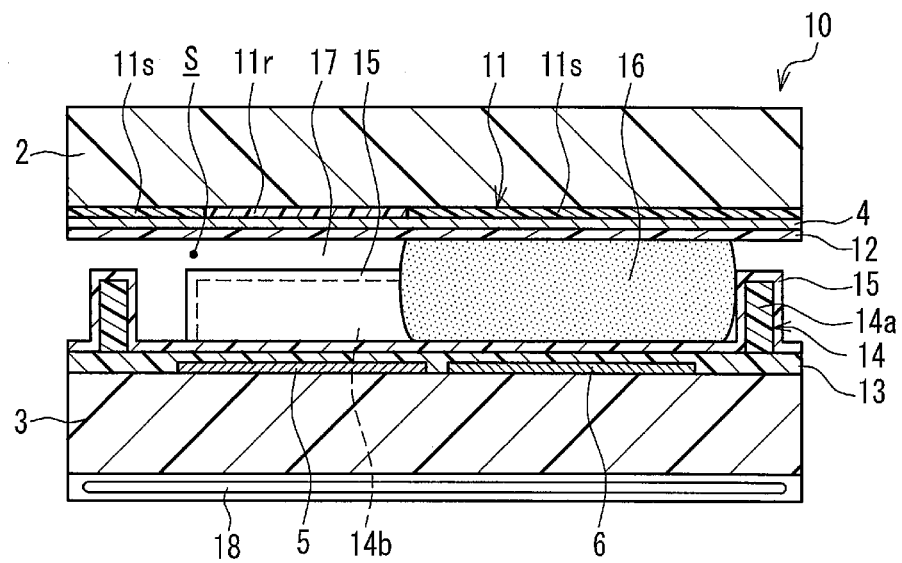

In FIGS. 3 to 5, the display element 10 includes the upper substrate 2 that is provided on the display surface side and serves as a first substrate, and the lower substrate 3 that is provided on the back (i.e., the non-display surface side) of the upper substrate 2 and serves as a second substrate. In the display element 10, the upper substrate 2 and the lower substrate 3 are located at a predetermined distance away from each other, so that a predetermined display space S is formed between the upper substrate 2 and the lower substrate 3. The polar liquid 16 and an insulating oil 17 that is not mixed with the polar liquid 16 are sealed in the display space S and can be moved in the X direction (the lateral direction of FIG. 4). The polar liquid 16 can be moved toward an effective display region P1 or a non-effective display region P2, as will be described later.

The polar liquid 16 can be, e.g., an aqueous solution including water as a solvent and a predetermined electrolyte as a solute. Specifically, 1 mmol/L of potassium chloride (KCl) aqueous solution may be used as the polar liquid 16. Moreover, the polar liquid 16 is colored a predetermined color, e.g., black with a self-dispersible pigment.

The polar liquid 16 is colored black and therefore functions as a shutter that allows or prevents light transmission. When the polar liquid 16 is slidably moved in the display space S toward the reference electrode 5 (i.e., the effective display region P1) or the scanning electrode 6 (i.e., the non-effective display region P2), the display color of each pixel of the display element 10 is changed to black or any color of RBG, as will be described in detail later.

The oil 17 can be, e.g., a nonpolar, colorless, and transparent oil including one or more than one selected from a side-chain higher alcohol, a side-chain higher fatty acid, an alkane hydrocarbon, a silicone oil, and a matching oil. The oil 17 is shifted in the display space S as the polar liquid 16 is slidably moved.

The upper substrate 2 can be, e.g., a transparent glass material such as a non-alkali glass substrate or a transparent sheet material such as a transparent synthetic resin (e.g., an acrylic resin). A color filter layer 11 and the signal electrodes 4 are formed in this order on the surface of the upper substrate 2 that faces the non-display surface side. Moreover, a hydrophobic film 12 is formed to cover the color filter layer 11 and the signal electrodes 4.

Like the upper substrate 2, the lower substrate 3 can be, e.g., a transparent glass material such as a non-alkali glass substrate or a transparent sheet material such as a transparent synthetic resin (e.g., an acrylic resin). The reference electrodes 5 and the scanning electrodes 6 are provided on the surface of the lower substrate 3 that faces the display surface side. Moreover, a dielectric layer 13 is formed to cover the reference electrodes 5 and the scanning electrodes 6. Ribs 14a and 14b are formed parallel to the Y direction and the X direction, respectively, on the surface of the dielectric layer 13 that faces the display surface side. In the lower substrate 3, a hydrophobic film 15 is further formed to cover the dielectric layer 13 and the ribs 14a, 14b.

A backlight 18 that emits, e.g., white illumination light is integrally attached to the back (i.e., the non-display surface side) of the lower substrate 3, thus providing a transmission type display element 10. The backlight 18 uses a light source such as a cold cathode fluorescent tube or a LED.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 3, the R, G, and B color filters 11r, 11g, and 11b are successively arranged in columns in the X direction, and each column includes four color filters 11r, 11g, and 11b in the Y direction. Thus, a total of twelve pixels are arranged in three columns (the X direction) and four rows (the Y direction).

As shown in FIG. 3, in each of the pixel regions P of the display element 10, any of the R, G, and B color filters 11r, 11g, and 11b is provided in a portion corresponding to the effective display region P1 of a pixel, and the black matrix 11s is provided in a portion corresponding to the non-effective display region P2 of the pixel. In other words, with respect to the display space S, the non-effective display region (non-aperture region) P2 is defined by the black matrix (light-shielding layer) 11s and the effective display region P1 is defined by an aperture (i.e., any of the color filters 11r, 11g, and 11b) formed in that black matrix 11s.

In the display element 10, the area of each of the color filters 11r, 11g, and 11b is the same as or slightly smaller than that of the effective display region P1. On the other hand, the area of the black matrix 11s is the same as or slightly larger than that of the non-effective display region P2. In FIG. 3, the boundary between two black matrixes 11s corresponding to the adjacent pixels is indicated by a dotted line to clarify the boundary between the adjacent pixels. Actually, however, no boundary is present between the black matrixes 11s of the color filter layer 11.

In the display element 10, the display space S is divided into the pixel regions P by ribs 14 having the ribs 14a, 14b serving as the partitions as described above. Specifically, as shown in FIG. 4, the display space S of each pixel is partitioned by two opposing ribs 14a and two opposing ribs 14b. Moreover, in the display element 10, the ribs 14a, 14b prevent the polar liquid 16 from flowing into the display space S of the adjacent pixel regions P. The ribs 14a, 14b are made of, e.g., an epoxy resin resist material, and the height of the ribs 14a, 14b protruding from the dielectric layer 13 (i.e., the rib height) is determined so as to prevent the flow of the polar liquid 16 between the adjacent pixels.

The hydrophobic films 12, 15 are made of, e.g., a transparent synthetic resin, and preferably a fluoro polymer that functions as a hydrophilic layer for the polar liquid 16 when a voltage is applied. This can significantly change the wettability (contact angle) between the polar liquid 16 and each of the surfaces of the upper and lower substrates 2, 3 that face the display space S. Thus, the speed of the movement of the polar liquid 16 can be improved. The dielectric layer 13 can be, e.g., a transparent dielectric film containing parylene, a silicon nitride, a hafnium oxide, a zinc oxide, a titanium dioxide, or an aluminum oxide. A specific thickness of each of the hydrophobic films 12, 15 ranges from several tens of nanometers to several micrometers. A specific thickness of the dielectric layer 13 is several hundred nanometers. The hydrophobic film 12 does not electrically insulate the signal electrodes 4 from the polar liquid 16, and therefore not interfere with the improvement in responsibility of the polar liquid 16.

The reference electrodes 5 and the scanning electrodes 6 are made of, e.g., transparent electrode materials such as indium oxides (ITO), tin oxides ($SnO_2$), and zinc oxides (AZO, GZO, or IZO). The reference electrodes 5 and the scanning electrodes 6 are formed in stripes on the lower substrate 3 by a known film forming method such as sputtering.

The signal electrodes 4 can be, e.g., linear wiring that is arranged parallel to the X direction. The signal electrodes 4 are made of, e.g., a transparent electrode material such as ITO. Moreover, the signal electrodes 4 are placed on the color filter layer 11 so as to extend substantially through the center of each of the pixel regions P in the Y direction, and further to come into electrical contact with the polar liquid 16 via the hydrophobic film 12. This can improve the responsibility of the polar liquid 16 during a display operation.

In each pixel of the display element 10 having the above configuration, as shown in FIG. 5A, when the polar liquid 16 is held between the color filter 11r and the reference electrode 5, light from the backlight 18 is blocked by the polar liquid 16, so that the black display (non-CF color display) is performed. On the other hand, as shown in FIG. 5B, when the polar liquid 16 is held between the black matrix 11s and the scanning electrode 6, light from the backlight 18 is not blocked by the polar liquid 16 and passes through the color filter 11r, so that the red display (CF color display) is performed.

Hereinafter, a display operation of the image display apparatus 1 of this embodiment having the above configuration will be described in detail with reference to FIGS. 6 to 9.

Figure 6:
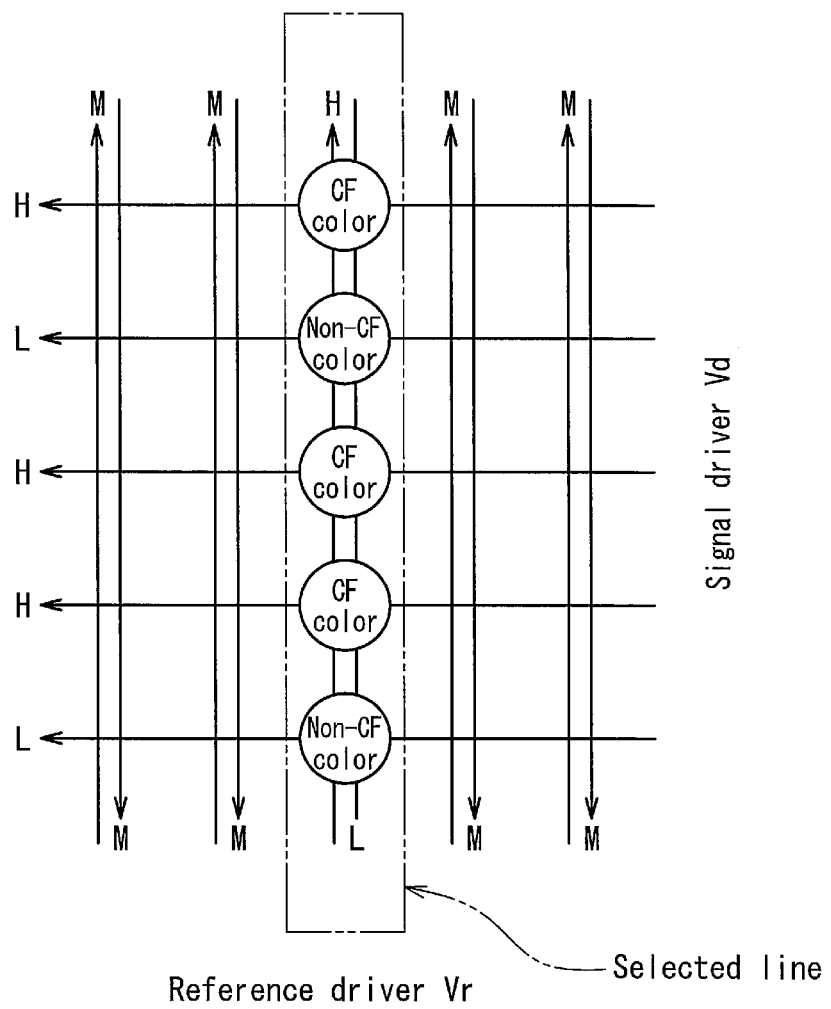
FIG. 6 is a diagram for explaining an operation example of the image display apparatus.
Figure 7A:
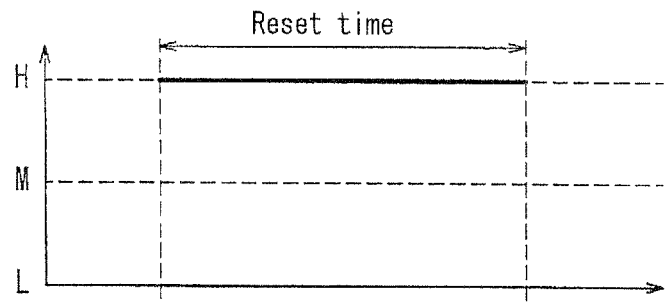
FIGS. 7A to 7C are waveform diagrams showing a specific example of reset signals that are supplied to the signal electrodes, the reference electrodes, and the scanning electrodes in FIG. 1, respectively.
Figure 7B:
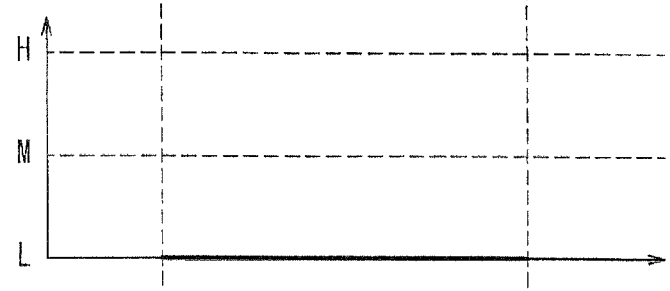
Figure 7C:
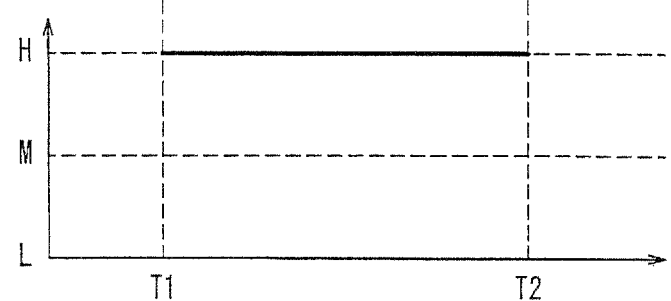
Figure 7D:
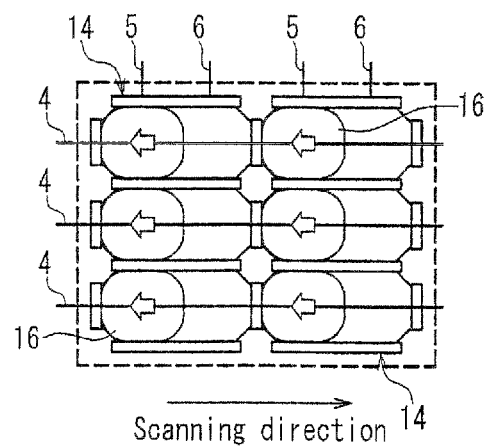
FIG. 7D is a diagram for explaining an operation example in pixel regions of the display element when the reset signals are supplied.
Figure 8A:
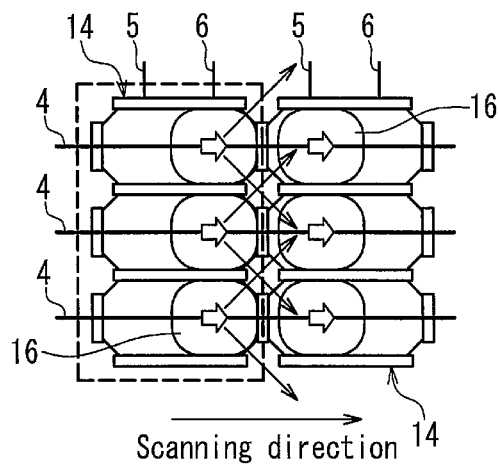
FIGS. 8A to 8C are diagrams for explaining an operation example in pixel regions of the display element before, at the time of, and after supplying pre-signals to the signal electrodes, the reference electrodes, and the scanning electrodes, respectively.
Figure 8B:
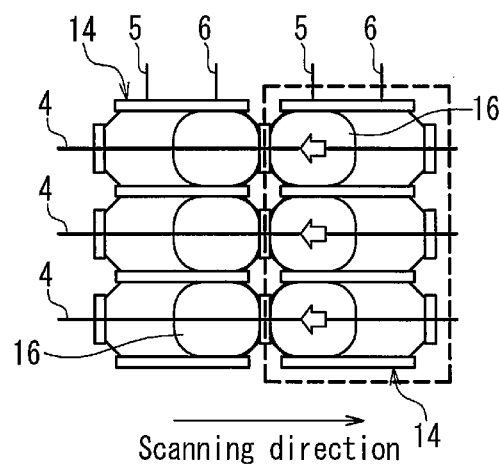
Figure 8C:
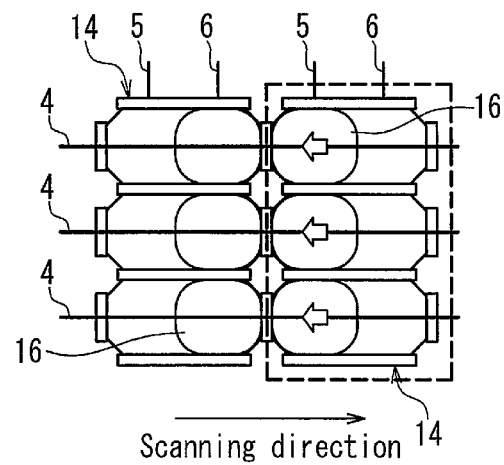
Figure 9A:
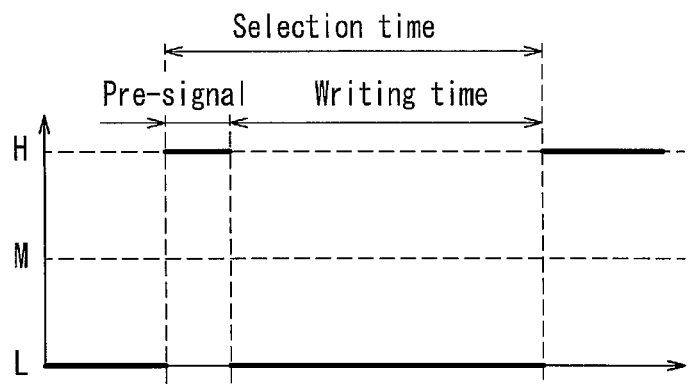
FIGS. 9A to 9C are waveform diagrams showing a specific example of pre-signals that are supplied to the signal electrodes, the reference electrodes, and the scanning electrodes, respectively.
Figure 9B:
Figure 9C:
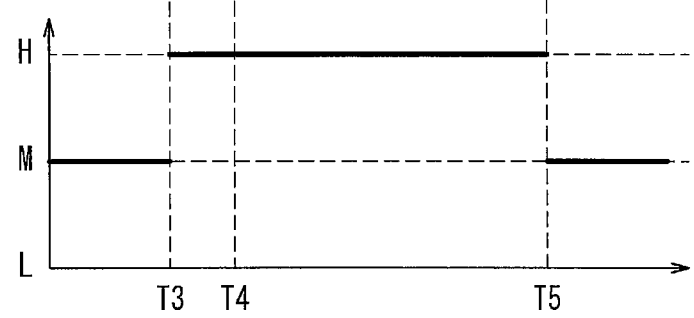

FIG. 6 is a diagram for explaining an operation example of the image display apparatus. FIGS. 7A to 7C are waveform diagrams showing a specific example of reset signals that are supplied to the signal electrodes, the reference electrodes, and the scanning electrodes in FIG. 1, respectively. FIG. 7D is a diagram for explaining an operation example in the pixel regions of the display element when the reset signals are supplied. FIGS. 8A to 8C are diagrams for explaining an operation example in the pixel regions of the display element before, at the time of, and after supplying pre-signals to the signal electrodes, the reference electrodes, and the scanning electrodes, respectively. FIGS. 9A to 9C are waveform diagrams showing a specific example of the pre-signals that are supplied to the signal electrodes, the reference electrodes, and the scanning electrodes, respectively.

First, a basic display operation of the image display apparatus 1 of this embodiment will be described in detail with reference to FIG. 6.

In FIG. 6, the reference driver 8 and the scanning driver 9 apply the selected voltages (i.e., the reference voltage Vr and the scanning voltage Vs) to the reference electrodes 5 and the scanning electrodes 6 in sequence in a predetermined scanning direction, e.g., from the left to the right of FIG. 6, respectively. Specifically, the reference driver 8 and the scanning driver 9 perform their scanning operations to determine a selected line by applying the H voltage (first voltage) and the L voltage (second voltage) as the selected voltages to the reference electrodes 5 and the scanning electrodes 6 in sequence, respectively. In this selected line, the signal driver 7 applies the H or L voltage (i.e., the signal voltage Vd) to the corresponding signal electrodes 4 in accordance with the external image input signal. Thus, in each of the pixels of the selected line, the polar liquid 16 is moved toward the effective display region P1 or the non-effective display region P2, and the display color on the display surface is changed accordingly.

On the other hand, the reference driver 8 and the scanning driver 9 apply the non-selected voltages (i.e., the reference voltage Vr and the scanning voltage Vs) to non-selected lines, namely to all the remaining reference electrodes 5 and scanning electrodes 6, respectively. Specifically, the reference driver 8 and the scanning driver 9 apply, e.g., intermediate voltages (Middle voltages, referred to as "M voltages" in the following) between the H voltage and the L voltage as the non-selected voltages to all the remaining reference electrodes 5 and scanning electrodes 6, respectively. Thus, in each of the pixels of the non-selected lines, the polar liquid 16 stands still without unnecessary displacement from the effective display region P1 or the non-effective display region P2, and the display color on the display surface is unchanged.

Table 1 shows the combinations of the voltages applied to the reference electrodes 5, the scanning electrodes 6, and the signal electrodes 4 in the above display operation. As shown in Table 1, the behavior of the polar liquid 16 and the display color on the display surface depend on the applied voltages. In Table 1, the H voltage, the L voltage, and the M voltage are abbreviated to "H", "L", and "M", respectively (the same is true for Table 2 in the following). The specific values of the H voltage, the L voltage, and the M voltage are, e.g., +16 V, 0 V, and +8 V, respectively.

TABLE 1

| | Reference electrode | Scanning electrode | Signal electrode | Behavior of polar liquid and display color on display surface |
|---|---|---|---|---|
| Selected line | H | L | H | The polar liquid is moved toward the scanning electrode. CF color display |
| | | | L | The polar liquid is moved toward the reference electrode. Black display |
| Non-selected line | M | M | H | The polar liquid is still (not moving). |
| | | | L | Black or CF color display |

<Selected Line Operation>

In the selected line, e.g., when the H voltage is applied to the signal electrodes 4, there is no potential difference between the reference electrode 5 and the signal electrodes 4 because the H voltage is applied to both of these electrodes. On the other hand, a potential difference between the signal electrodes 4 and the scanning electrode 6 occurs because the L voltage is applied to the scanning electrode 6. Therefore, the polar liquid 16 is moved in the display space S toward the scanning electrode 6 that makes a potential difference from the signal electrodes 4. Consequently, the polar liquid 16 has been moved to the non-effective display region P2 side, as shown in FIG. 5B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the polar liquid 16 toward the non-effective display region P2, the red, green, and blue colors of light from the corresponding R, G, and B pixels are mixed into white light, resulting in the white display.

In the selected line, when the L voltage is applied to the signal electrodes 4, a potential difference occurs between the reference electrode 5 and the signal electrodes 4, but not between the signal electrodes 4 and the scanning electrode 6. Therefore, the polar liquid 16 is moved in the display space S toward the reference electrode 5 that makes a potential difference from the signal electrodes 4. Consequently, the polar liquid 16 has been moved to the effective display region P1 side, as shown in FIG. 5A, and prevents the illumination light emitted from the backlight 18 from reaching the color filter 11r. Thus, the display color on the display surface becomes black display (i.e., the non-CF color display) due to the presence of the polar liquid 16.

<Non-Selected Line Operation>

In the non-selected lines, e.g., when the H voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the L voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

As described above, in the non-selected lines, the polar liquid 16 is not moved, but stands still and the display color on the display surface is unchanged regardless of whether the H or L voltage is applied to the signal electrodes 4.

On the other hand, in the selected line, the polar liquid 16 can be moved in accordance with the voltage applied to the signal electrodes 4, as described above, and the display color on the display surface can be changed accordingly.

In the image display apparatus 1, depending on the combinations of the applied voltages in Table 1, the display color of each pixel on the selected line can be, e.g., the CF colors (red, green, or blue) produced by the color filters 11r, 11g, and 11b or the non-CF color (black) due to the polar liquid 16 in accordance with the voltage applied to the signal electrodes 4 corresponding to the individual pixels, as shown in FIG. 6. When the reference driver 8 and the scanning driver 9 determine a selected line of the reference electrode 5 and the scanning electrode 6 by performing their scanning operations, e.g., from the left to the right of FIG. 6, the display colors of the pixels in the display portion of the image display apparatus 1 also are changed in sequence from the left to the right of FIG. 6. Therefore, if the reference driver 8 and the scanning driver 9 perform the scanning operations at a high speed, the display colors of the pixels in the display portion of the image display apparatus 1 also can be changed at a high speed. Moreover, by applying the signal voltage Vd to the signal electrodes 4 in synchronization with the scanning operation for the selected line, the image display apparatus 1 can display various information including dynamic images based on the external image input signal.

The combinations of the voltages applied to the reference electrodes 5, the scanning electrodes 6, and the signal electrodes 4 are not limited to Table 1, and may be as shown in Table 2.

TABLE 2

| | Reference electrode | Scanning electrode | Signal electrode | Behavior of polar liquid and display color on display surface |
|---|---|---|---|---|
| Selected line | L | H | L | The polar liquid is moved toward the scanning electrode. CF color display |
| | | | H | The polar liquid is moved toward the reference electrode. Black display |
| Non-selected line | M | M | H | The polar liquid is still (not moving). |
| | | | L | Black or CF color display |

The reference driver 8 and the scanning driver 9 perform their scanning operations to determine a selected line by applying the L voltage (second voltage) and the H voltage (first voltage) as the selected voltages to the reference electrodes 5 and the scanning electrodes 6 in sequence in a predetermined scanning direction, e.g., from the left to the right of FIG. 6, respectively. In this selected line, the signal driver 7 applies the H or L voltage (i.e., the signal voltage Vd) to the corresponding signal electrodes 4 in accordance with the external image input signal.

On the other hand, the reference driver 8 and the scanning driver 9 apply the M voltages as the non-selected voltages to the non-selected lines, namely to all the remaining reference electrodes 5 and scanning electrodes 6.

<Selected Line Operation>

In the selected line, e.g., when the L voltage is applied to the signal electrodes 4, there is no potential difference between the reference electrode 5 and the signal electrodes 4 because the L voltage is applied to both of these electrodes. On the other hand, a potential difference between the signal electrodes 4 and the scanning electrode 6 occurs because the H voltage is applied to the scanning electrode 6. Therefore, the polar liquid 16 is moved in the display space S toward the scanning electrode 6 that makes a potential difference from the signal electrodes 4. Consequently, the polar liquid 16 has been moved to the non-effective display region P2 side, as shown in FIG. 5B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. Like Table 1, when the CF color display is performed in all the three adjacent R, G, and B pixels, the white display is performed.

In the selected line, when the H voltage is applied to the signal electrodes 4, a potential difference occurs between the reference electrode 5 and the signal electrodes 4, but not between the signal electrodes 4 and the scanning electrode 6. Therefore, the polar liquid 16 is moved in the display space S toward the reference electrode 5 that makes a potential difference from the signal electrodes 4. Consequently, the polar liquid 16 has been moved to the effective display region P1 side, as shown in FIG. 5A, and prevents the illumination light emitted from the backlight 18 from reaching the color filter 11r. Thus, the display color on the display surface becomes black display (i.e., the non-CF color display) due to the presence of the polar liquid 16.

<Non-Selected Line Operation>

In the non-selected lines, e.g., when the L voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the H voltage is applied to the signal electrodes 4, the polar liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

In the non-selected lines, as shown in Table 2, similarly to Table 1, the polar liquid 16 is not moved, but stands still and the display color on the display surface is unchanged regardless of whether the H or L voltage is applied to the signal electrodes 4.

On the other hand, in the selected line, the polar liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 not only has two values of the H voltage and the L voltage, but also may be changed between the H voltage and the L voltage in accordance with information to be displayed on the display surface. That is, the image display apparatus 1 can perform the gradation display by controlling the signal voltage Vd. Thus, the display element 10 can achieve excellent display performance.

Next, an operation example using the predetermined reset signals will be described in detail with reference to FIGS. 7A to 7D.

In the image display apparatus 1 of this embodiment, as described above, the reset signal instruction portion 21 instructs the signal driver 7, the reference driver 8, and the scanning driver 9 to apply the voltages of the predetermined reset signals after displaying the information for one frame and before performing the scanning operation in the next frame.

In this instruction operation, the signal driver 7 applies the H voltage to all the signal electrodes 4 for a predetermined reset time from the time T1 to the time T2, as shown in FIG. 7A. The reference driver 8 applies the L voltage to all the reference electrodes 5 for the predetermined reset time, as shown in FIG. 7B. The scanning driver 9 applies the H voltage to all the scanning electrodes 6 for the predetermined reset time, as shown in FIG. 7C. Thus, in the display element 10, as shown in FIG. 7D, the polar liquid 16 in each of all the pixel regions is moved to the initial position that is set on the effective display region (reference electrode 5) side opposite the scanning direction, as indicated by the arrows in FIG. 7D.

In the above description, as the predetermined reset signals, the H voltage, the L voltage, and the H voltage are applied to the signal electrodes 4, the reference electrodes 5, and the scanning electrodes 6, respectively. However, the reset signals of this embodiment are not limited thereto, as long as the polar liquid 16 in each of all the pixel regions is moved to the initial position. For example, the L voltage, the H voltage, and the L voltage may be applied to the signal electrodes 4, the reference electrodes 5, and the scanning electrodes 6, respectively.

Next, an operation example using the predetermined pre-signals will be described in detail with reference to FIGS. 8A to 8C and 9A to 9C.

As shown in FIG. 8A, three pixel regions surrounded by a dotted line are selected as objects of the scanning operation (i.e., the selected line), and the L voltage, the L voltage, and the H voltage are applied to the signal electrodes 4, the reference electrode 5, and the scanning electrode 6, respectively. Then, the polar liquid 16 in each of these pixel regions is moved from the initial position to the scanning electrode 6 side, as indicated by the arrows in FIG. 8A. Consequently, according to the movement of the polar liquid 16 in each of the three pixel regions, the oil 17 enters the adjacent pixel regions (i.e., the non-selected line) located in the scanning direction, as indicated by the oblique arrows in FIG. 8A. In the pixel regions of this non-selected line, although the M voltages are applied to the reference electrode 5 and the scanning electrode 6, the polar liquid 16 is moved by a very small amount from the initial position toward the scanning electrode 6 due to the oil 17 that has entered, as indicated by the arrows in FIG. 8A.

Subsequently, when the objects of the scanning operation (i.e., the selected line) are changed from the left three pixel regions to the right three pixel regions, as indicated by a dotted line in FIG. 8B, the M voltages are applied to the reference electrode 5 and the scanning electrode 6 in the left three pixel regions, which are identified as a non-selected line, and thus the polar liquid 16 is held in the position on the scanning electrode 6 side. On the other hand, in the right three pixel regions, which are identified as a selected line, the voltages of the predetermined pre-signals are applied to the signal electrodes 4, the reference electrode 5, and the scanning electrode 6 in accordance with the instruction signals from the pre-signal instruction portion 22 when the scanning operation is performed.

Specifically, in the right three pixel regions, the H voltage, the L voltage, and the H voltage are applied as the voltages of the predetermined pre-signals to the signal electrodes 4, the reference electrode 5, and the scanning electrode 6 for a predetermined pre-signal application time from the time T3 to the time T4, as shown in FIGS. 9A, 9B, and 9C, respectively. Thus, the polar liquid 16 in each of these pixel regions is moved by a very small amount (shown in FIG. 8A) toward the initial position, as indicated by the arrows in FIG. 8B. That is, the polar liquid 16 in each of these pixel regions returns to the original initial position, to which the polar liquid 16 has been moved by the reset signals. The movement of the polar liquid 16 by the pre-signals has no adverse effect on the polar liquid 16 in each of the pixel regions of the first previous scanning operation, i.e., the left three pixel regions because the polar liquid 16 is moved only by a very small amount. In other words, the polar liquid 16 in each of the left three pixel regions is held in the position on the scanning electrode 6 side, to which the polar liquid 16 has been moved in accordance with the first previous scanning operation.

Moreover, in the display element 10 of this embodiment, the very small amount has been previously acquired by simulations or tests using a real machine, and the application time (i.e., the time from T3 to T4) of the predetermined pre-signals is determined based on the acquired results.

Thereafter, in the right three pixel regions, e.g., the L voltage, the L voltage, and the H voltage are written into the signal electrodes 4, the reference electrode 5, and the scanning electrode 6 for a writing time from the time T4 to the time T5, as shown in FIGS. 9A, 9B, and 9C, respectively. Thus, as shown in FIG. 8C, the polar liquid 16 in each of the right three pixel regions is held in the position (initial position) on the scanning electrode 6 side in accordance with the current scanning operation.

In the above description, as the predetermined pre-signals, the H voltage, the L voltage, and the H voltage are applied to the signal electrodes 4, the reference electrodes 5, and the scanning electrodes 6, respectively. However, the pre-signals of this embodiment are not limited thereto, as long as the polar liquid 16 in each of a plurality of the pixel regions to be scanned is held on the initial position side at the same time when the scanning operation is performed. For example, the L voltage, the H voltage, and the L voltage may be applied to the signal electrodes 4, the reference electrodes 5, and the scanning electrodes 6, respectively.

In the display element 10 of this embodiment having the above configuration, the display control DC supplies the predetermined reset signals to the signal electrodes 4, the reference electrodes 5, and the scanning electrodes 6 so that the polar liquid 16 in each of all the pixel regions is moved to the initial position that is set on the effective display region P1 side opposite the scanning direction before the scanning operation is performed. Thus, in the display element 10 of this embodiment, since the polar liquid 16 in each of all the pixel regions can be moved to the initial position before the scanning operation is performed, the polar liquid 16 can be moved precisely to the desired position in the next display operation. Consequently, unlike the conventional example, the display element 10 of this embodiment can prevent a reduction in the display quality even if the gradation display is performed.

Hereinafter, the effect of setting the initial position on the effective display region P1 side opposite the scanning direction will be described in detail with reference to FIG. 10. The following description is directed to an operation of a comparative example in which, unlike the product of this embodiment, the initial position is set on the non-effective display region P2 side, i.e., on the same side as the scanning direction. By explaining the operation of the comparative example, the effect of the product of this embodiment will be demonstrated.

Figure 10A:
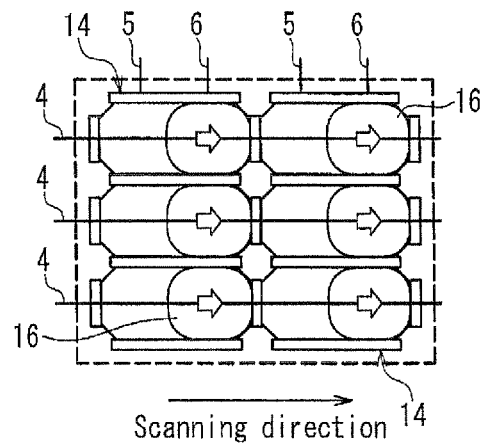
FIGS. 10A to 10C are diagrams for explaining an operation example in pixel regions of a comparative example.
Figure 10B:
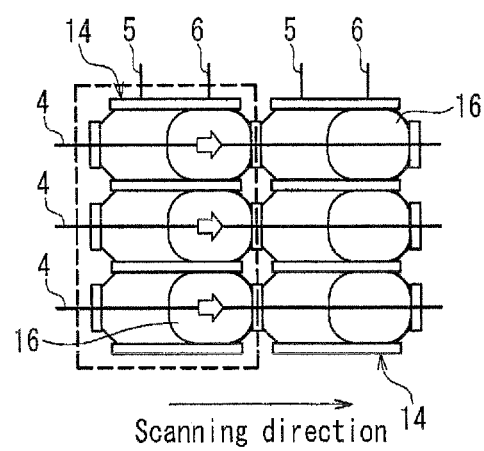
Figure 10C:
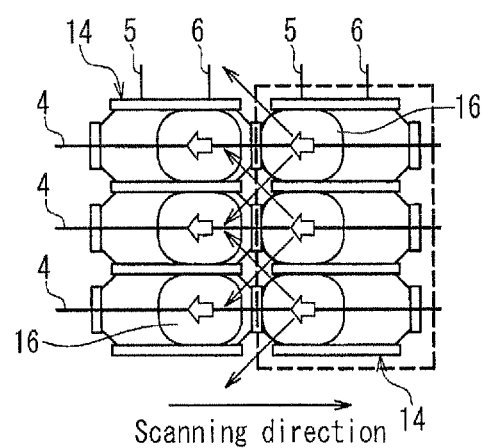

FIGS. 10A to 10C are diagrams for explaining an operation example in the pixel regions of the comparative example.

As shown in FIG. 10A, in the comparative example, e.g., the L voltage, the L voltage, and the H voltage are applied to all the signal electrodes 4, all the reference electrodes 5, and all the scanning electrodes 6, respectively, after displaying the information for one frame and before performing the scanning operation in the next frame. Thus, the polar liquid 16 in each of all the pixel regions is moved to the initial position that is set on the non-effective display region P2 side.

Subsequently, as shown in FIG. 10B, three pixel regions surrounded by a dotted line are selected as objects of the scanning operation (i.e., the selected line), and the L voltage, the L voltage, and the H voltage are applied to the signal electrodes 4, the reference electrode 5, and the scanning electrode 6, respectively. Then, the polar liquid 16 in each of these pixel regions is held on the initial position side on the scanning electrode 6 side, as indicated by the arrows in FIG. 10B.

Thereafter, when the objects of the scanning operation (i.e., the selected line) are changed from the left three pixel regions to the right three pixel regions, as indicated by a dotted line in FIG. 10C, the M voltages are applied to the reference electrode 5 and the scanning electrode 6 in the left three pixel regions, which are identified as a non-selected line. On the other hand, in the right three pixel regions, which are identified as a selected line, e.g., the H voltage, the L voltage, and the H voltage are applied to the signal electrodes 4, the reference electrode 5, and the scanning electrode 6, respectively. Then, the polar liquid 16 in each of these pixel regions is moved from the initial position to the reference electrode 5 side, as indicated by the arrows in FIG. 10C. Consequently, according to the movement of the polar liquid 16 in each of the three pixel regions, the oil 17 enters the adjacent pixel regions (i.e., the non-selected line) located in the opposite direction of the scanning direction, as indicated by the oblique arrows in FIG. 10C. In the pixel regions of this non-selected line, although the M voltages are applied to the reference electrode 5 and the scanning electrode 6, the polar liquid 16 is moved by a very small amount from the initial position toward the reference electrode 5 due to the oil 17 that has entered, as indicated by the arrows in FIG. 10C. Thus, the polar liquid 16 in each of the left three pixel regions is unnecessarily moved after the scanning operation is finished. Therefore, in this comparative example, a subtle color shift occurs, and the display quality is reduced.

In contrast, in the display element 10 of this embodiment, as shown in FIG. 7D, the polar liquid 16 in each of all the pixel regions has been moved to the initial position that is set on the effective display region P1 side opposite the scanning direction by supplying the predetermined reset signals before the scanning operation is performed. Consequently, unlike the comparative example, the display element 10 of this embodiment can prevent the unnecessary movement of the polar liquid 16 in each of the pixel regions of the non-selected line after the scanning operation, and thus can move the polar liquid 16 precisely to the desired position in the next scanning operation.

In the image display apparatus (electric device) 1 of this embodiment, the display portion uses the display element 10 that can prevent a reduction in the display quality even if the gradation display is performed. Thus, a high-performance image display apparatus (electric device) 1 including the display portion with excellent display quality can be easily provided.

In the display element 10 of this embodiment, the display control DC supplies the predetermined pre-signals to the signal electrodes 4, the reference electrodes 5, and the scanning electrodes 6 so that the polar liquid 16 in each of the pixel regions to be scanned is held on the initial position side when the scanning operation is performed. Therefore, since the polar liquid 16 in each of the pixel regions to be scanned can be held on the initial position side, a reduction in the display quality can be reliably prevented even if the gradation display is performed.

In the display element 10 of this embodiment, the display control DC supplies the predetermined pre-signals to the signal electrodes 4, the reference electrodes 5, and the scanning electrodes 6 so that the polar liquid 16 in each of a plurality of the pixel regions to be scanned is held on the initial position side at the same time when the scanning operation is performed. Therefore, since the polar liquid 16 in each of a plurality of the pixel regions can be held on the initial position side at the same time, the configuration of the display control DC can be simplified.

In the display element 10 of this embodiment, the signal driver (signal voltage application portion) 7, the reference driver (reference voltage application portion) 8, and the scanning driver (scanning voltage application portion) 9 apply the signal voltage Vd, the reference voltage Vr, and the scanning voltage Vs, along with the voltages of the reset signals and the voltages of the pre-signals, to the signal electrodes 4, the reference electrodes 5, and the scanning electrodes 6, respectively. Thus, in this embodiment, a matrix-driven display element 10 with excellent display quality can be easily provided.

In the display element 10 of this embodiment, the reset signal instruction portion 21 selects the maximum voltage or the minimum voltage of the signal voltage Vd as the voltage of the reset signal to be applied to the signal electrodes 4. Moreover, the reset signal instruction portion 21 selects one of the selected voltage and the non-selected voltage as the voltage of the reset signal to be applied to the reference electrodes 5, and selects the other of the selected voltage and the non-selected voltage as the voltage of the reset signal to be applied to the scanning electrodes 6. Thus, in the display element 10 of this embodiment, since the same voltages can be used for both the voltages applied in the scanning operation and the voltages of the reset signals, the configuration of each of the signal driver 7, the reference driver 8, and the scanning driver 9 can be simplified.

In the display element 10 of this embodiment, the pre-signal instruction portion 22 selects the maximum voltage or the minimum voltage of the signal voltage Vd as the voltage of the pre-signal to be applied to the signal electrodes 4. Moreover, the pre-signal instruction portion 22 selects one of the selected voltage and the non-selected voltage as the voltage of the pre-signal to be applied to the reference electrodes 5, and selects the other of the selected voltage and the non-selected voltage as the voltage of the pre-signal to be applied to the scanning electrodes 6. Thus, in the display element 10 of this embodiment, since the same voltages can be used for both the voltages applied in the scanning operation and the voltages of the pre-signals, the configuration of each of the signal driver 7, the reference driver 8, and the scanning driver 9 can be simplified.

Embodiment 2

Figure 11:
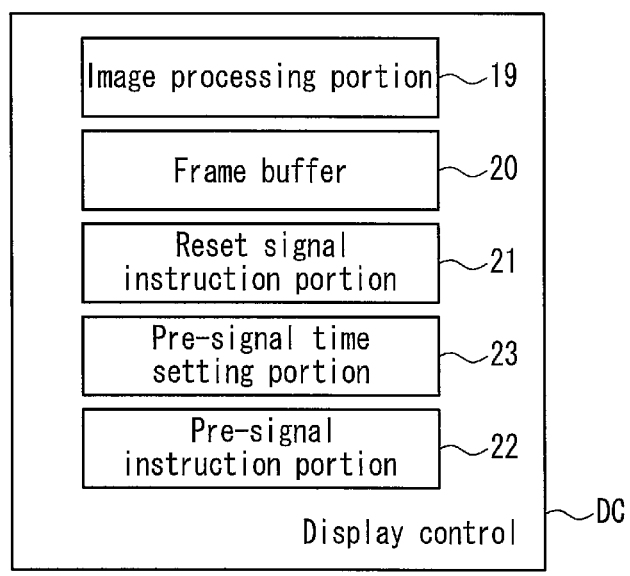
FIG. 11 is a block diagram showing the specific configuration of a display control of a display element of Embodiment 2 of the present invention.

FIG. 11 is a block diagram showing the specific configuration of a display control of a display element of Embodiment 2 of the present invention. In FIG. 11, this embodiment mainly differs from Embodiment 1 in that a pre-signal time setting portion is provided. The pre-signal time setting portion sets an application time of the pre-signals to the signal electrodes, the reference electrodes, and the scanning electrodes. The same components as those of Embodiment 1 are denoted by the same reference numerals, and the explanation will not be repeated.

As shown in FIG. 11, the display control DC of this embodiment includes a pre-signal time setting portion 23 for setting an application time of the pre-signals to the signal electrodes 4, the reference electrodes 5, and the scanning electrodes 6. In the display element 10 of this embodiment, the application time can be set externally. Moreover, in the display control DC of this embodiment, the pre-signal instruction portion 22 uses the application time set by the pre-signal time setting portion 23, selects a voltage of the pre-signal to be applied to the signal electrodes 4, a voltage of the pre-signal to be applied to the reference electrodes 5, and a voltage of the pre-signal to be applied to the scanning electrodes 6, and then instructs the signal driver 7, the reference driver 8, and the scanning driver 9.

Hereinafter, an application operation of the pre-signals in the display element 10 of this embodiment will be described in detail with reference to FIGS. 12A to 12C.

Figure 12A:
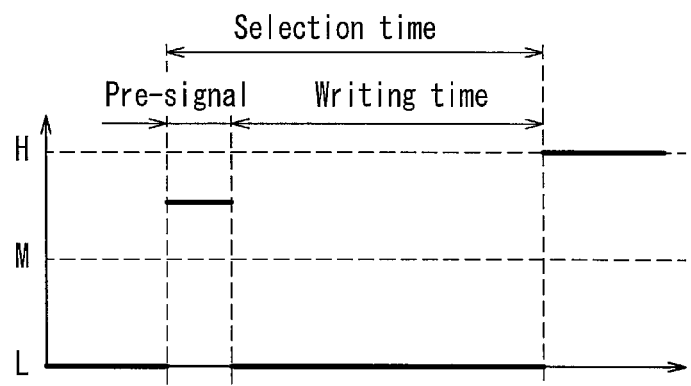
FIGS. 12A to 12C are waveform diagrams showing a specific example of pre-signals that are supplied to the signal electrodes, the reference electrodes, and the scanning electrodes of the display element of Embodiment 2, respectively.
Figure 12B:
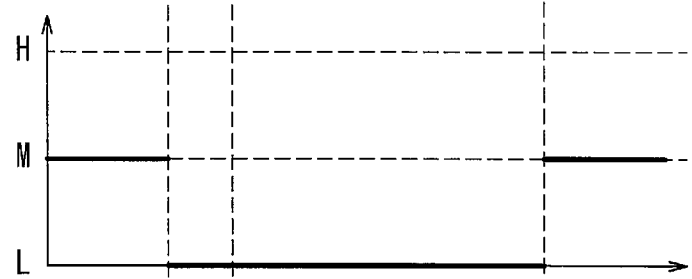
Figure 12C:
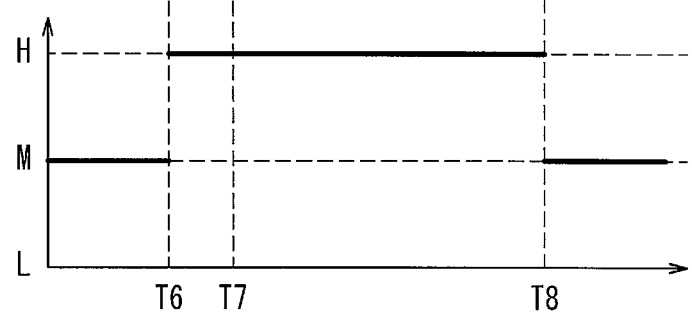

FIGS. 12A to 12C are waveform diagrams showing a specific example of the pre-signals that are supplied to the signal electrodes, the reference electrodes, and the scanning electrodes, respectively.

In the display element 10 of this embodiment, an application time of the pre-signals is set to the pre-signal time setting portion 23. Specifically, as the application time of the pre-signals, e.g., 10% of the selection time in the selected line is set to the pre-signal time setting portion 23. When the application time of the pre-signals is set to the pre-signal time setting portion 23, the pre-signal instruction portion 22 selects the voltages of the pre-signals required to move the polar liquid 16 by a very small amount (shown in FIG. 8A) back to the initial position for the signal electrodes 4, the reference electrodes 5, and the scanning electrodes 6, respectively.

Specifically, as shown in FIG. 12A, the pre-signal instruction portion 22 selects, e.g., an intermediate voltage between the H voltage and the M voltage as a voltage of the pre-signal to be applied to the signal electrodes 4. As shown in FIG. 12B, the pre-signal instruction portion 22 selects, e.g., the L voltage as a voltage of the pre-signal to be applied to the reference electrode 5. As shown in FIG. 12C, the pre-signal instruction portion 22 selects, e.g., the H voltage as a voltage of the pre-signal to be applied to the scanning electrode 6. Then, the pre-signal instruction portion 22 outputs the instruction signals to the signal driver 7, the reference driver 8, and the scanning driver 9, so that the voltages of the pre-signals are applied to the corresponding signal electrodes 4, reference electrode 5, and scanning electrode 6 for the application time from the time T6 to the time T7, respectively. Subsequently, e.g., the L voltage, the L voltage, and the H voltage are written into the signal electrodes 4, the reference electrode 5, and the scanning electrode 6 for a writing time from the time T7 to the time T8, respectively. Thus, the display color corresponding to these written voltages is displayed.

With the above configuration, this embodiment can have effects comparable to those of Embodiment 1. In this embodiment, the pre-signal time setting portion 23 is configured to be able to set the application time of the pre-signals to the signal electrodes 4, the reference electrodes 5, and the scanning electrodes 6. Moreover, the pre-signal instruction portion 22 uses the application time set by the pre-signal time setting portion 23 to select the voltage of the pre-signal to be applied to the signal electrodes 4, the voltage of the pre-signal to be applied to the reference electrodes 5, and the voltage of the pre-signal to be applied to the scanning electrodes 6. Thus, in this embodiment, the voltages of the pre-signals to be applied are changed by adjusting the application time of the pre-signals, so that even the speed of the movement of the polar liquid can be controlled by those pre-signals. Consequently, it is possible to suppress the effect of the movement of the polar liquid 16 on the adjacent pixel regions due to the pre-signals. Therefore, high resolution gradation display can be easily performed.

Embodiment 3

Figure 13:
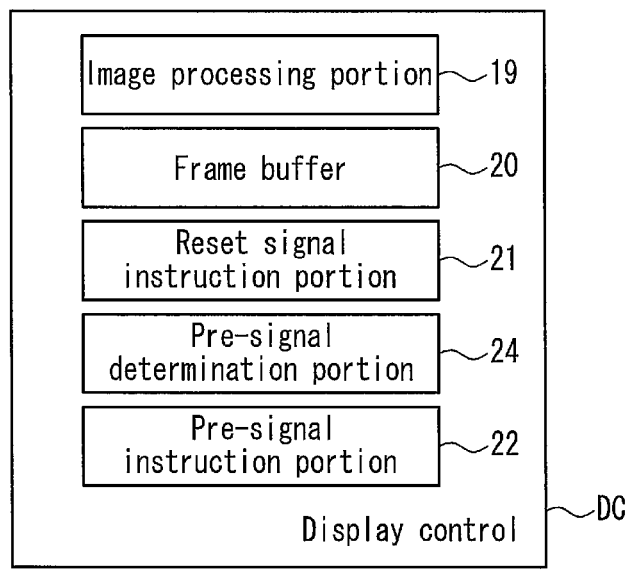
FIG. 13 is a block diagram showing the specific configuration of a display control of a display element of Embodiment 3 of the present invention.

FIG. 13 is a block diagram showing the specific configuration of a display control of a display element of Embodiment 3 of the present invention. In FIG. 13, this embodiment mainly differs from Embodiment 1 in that a pre-signal determination portion is provided. The pre-signal determination portion determines the amount of displacement of the polar liquid due to the first previous scanning operation in each of the pixel regions to be scanned, and also uses the amount of displacement thus obtained to determine a voltage and an application time of the pre-signal to be applied to the signal electrodes, a voltage and an application time of the pre-signal to be applied to the reference electrodes, and a voltage and an application time of the pre-signal to be applied to the scanning electrodes. The same components as those of Embodiment 1 are denoted by the same reference numerals, and the explanation will not be repeated.

In FIG. 13, the display control DC of this embodiment is configured to supply the predetermined pre-signals to the signal electrodes 4, the reference electrodes 5, and the scanning electrodes 6 so that the polar liquid 16 in each of a plurality of the pixel regions to be scanned is held on the initial position side for each pixel region when the scanning operation is performed.

Specifically, the display control DC of this embodiment includes a pre-signal determination portion 24. The pre-signal determination portion 24 is configured to determine the amount of displacement of the polar liquid 16 due to the first previous scanning operation in each of the pixel regions to be scanned by using a table or a function in a memory (not shown). The pre-signal determination portion 24 also uses the amount of displacement thus obtained to determine a voltage and an application time of the pre-signal to be applied to the signal electrodes 4, a voltage and an application time of the pre-signal to be applied to the reference electrodes 5, and a voltage and an application time of the pre-signal to be applied to the scanning electrodes 6.

Moreover, the pre-signal determination portion 24 uses the amount of displacement thus obtained to determine a voltage and an application time of the pre-signal to be applied to the signal electrodes 4, a voltage and an application time of the pre-signal to be applied to the reference electrodes 5, and a voltage and an application time of the pre-signal to be applied to the scanning electrodes 6 so that the polar liquid 16 in each of the pixel regions to be scanned is held in the current position when the scanning operation is performed. Thus, the pre-signals can be supplied within the selection time of the scanning operation, while the polar liquid 16 in each of the pixel regions to be scanned is not moved by the pre-signals.

In the display control DC of this embodiment, the pre-signal instruction portion 22 produces an instruction signal including the voltage and the application time of the pre-signal to be applied to the signal electrodes 4 determined by the pre-signal determination portion 24, and outputs the instruction signal to the signal driver 7. Moreover, the pre-signal instruction portion 22 produces an instruction signal including the voltage and the application time of the pre-signal to be applied to the reference electrodes 5 determined by the pre-signal determination portion 24, and outputs the instruction signal to the reference driver 8. Further, the pre-signal instruction portion 22 produces an instruction signal including the voltage and the application time of the pre-signal to be applied to the scanning electrodes 6 determined by the pre-signal determination portion 24, and outputs the instruction signal to the scanning driver 9.

Hereinafter, an operation example of the display element 10 of this embodiment will be described in detail with reference to FIGS. 14 to 16.

Figure 14:
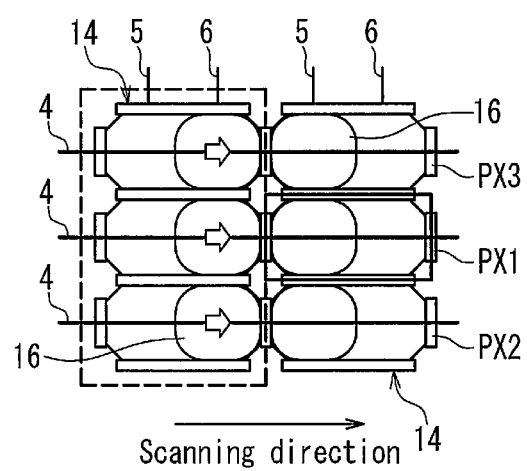
FIG. 14 is a diagram for explaining the main operation process of the pre-signal determination portion in FIG. 13.

FIG. 14 is a diagram for explaining the main operation process of the pre-signal determination portion in FIG. 13.

Figure 15A:
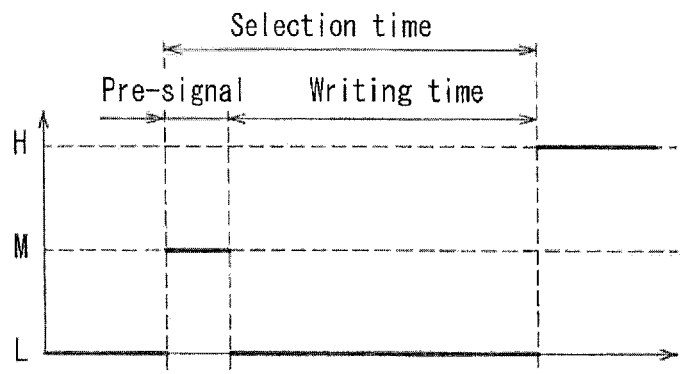
FIGS. 15A to 15C are waveform diagrams showing a specific example of pre-signals that are supplied to the signal electrodes, the reference electrodes, and the scanning electrodes of the display element of Embodiment 3, respectively.
Figure 15B:
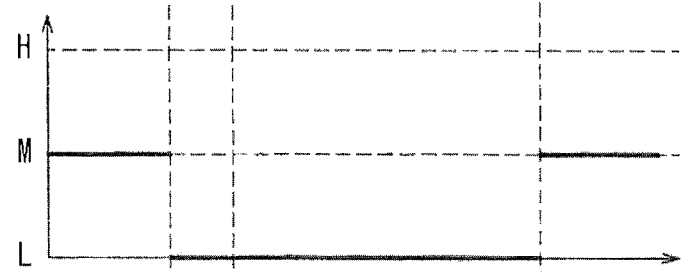
Figure 15C:
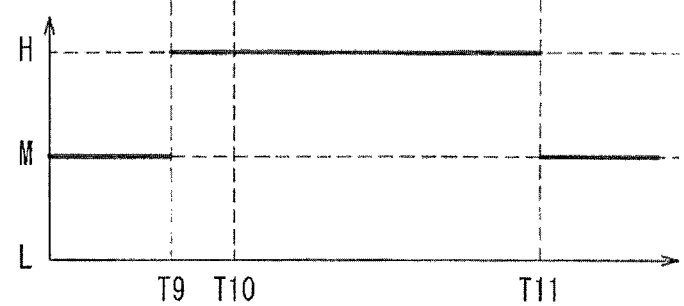
Figure 16A:
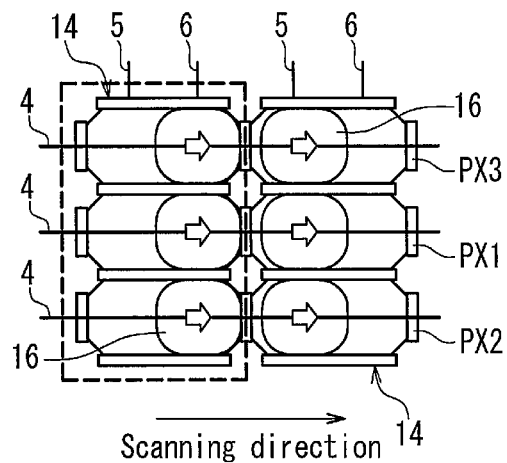
FIGS. 16A and 16B are diagrams for explaining an operation example in pixel regions of the display element of Embodiment 3.
Figure 16B:
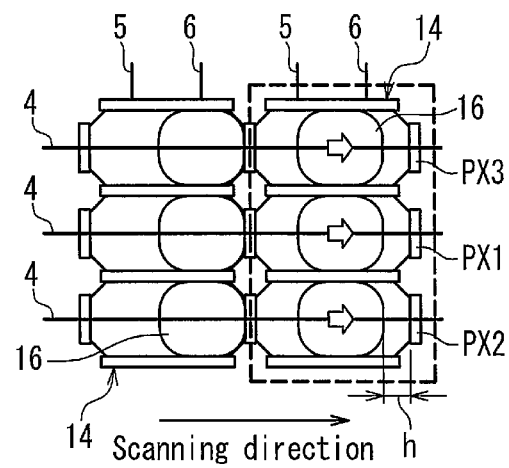
Figure 16C:
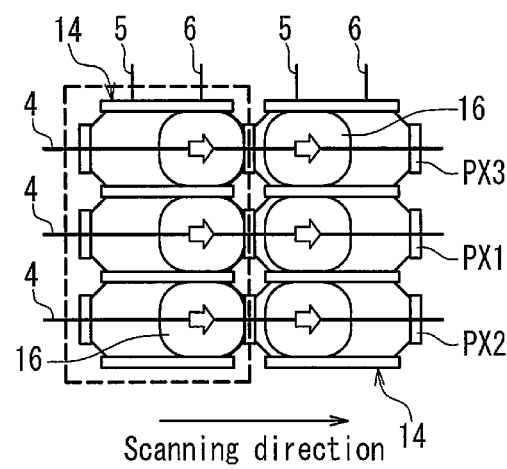
FIGS. 16C and 16D are diagrams for explaining an operation example in pixel regions when no pre-signal is supplied.
Figure 16D:
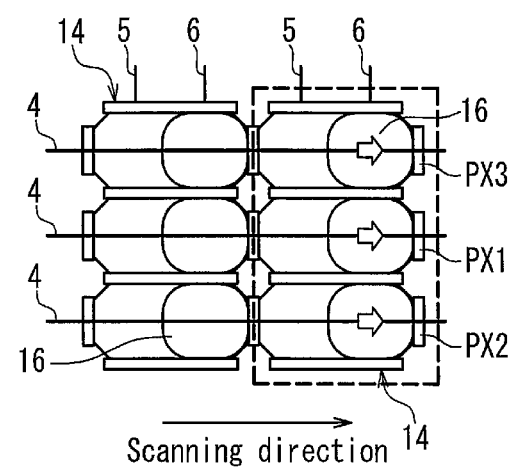

FIGS. 15A to 15C are waveform diagrams showing a specific example of the pre-signals that are supplied to the signal electrodes, the reference electrodes, and the scanning electrodes of the display element of Embodiment 3, respectively. FIGS. 16A and 16B are diagrams for explaining an operation example in the pixel regions of the display element of Embodiment 3. FIGS. 16C and 16D are diagrams for explaining an operation example in the pixel regions when no pre-signal is applied.

First, the main operation process of the pre-signal determination portion will be described with reference to FIG. 14.

In FIG. 14, e.g., tests are performed using a real machine to determine the amount of displacement of the polar liquid 16 from the initial position in a pixel region PX1 by inputting various operation signals (i.e., the voltages applied to the corresponding signal electrodes 4, the corresponding reference electrode 5, and the corresponding scanning electrode 6) to three pixel regions for the first previous scanning operation (surrounded by a dotted line in FIG. 14) of the adjacent pixel regions of the pixel region PX1 to be measured. Then, the relationships between the operation signals input to the three pixel regions and the amount of displacement of the polar liquid 16 in the pixel region PX1 are represented by a table or a function beforehand. This process of representing the above relationships by a table or a function is also performed in the same manner on pixel regions PX2 and PX3. Thus, the relationships between the operation signals and the amount of displacement in all the pixel regions within the display surface have been previously determined, represented by a table or a function, and stored in the memory.

As shown in FIG. 16A, when the scanning operation is performed on the three pixel regions for the first previous scanning operation (surrounded by a dotted line in FIG. 16A) of the adjacent pixel regions of the pixel region PX1, the pre-signal determination portion 24 acquires operation signals (i.e., the voltages applied to the corresponding signal electrodes 4, the corresponding reference electrode 5, and the corresponding scanning electrode 6) in this scanning operation in each of the three pixel regions. Then, the pre-signal determination portion 24 uses the acquired operation signals to determine the amount of displacement of the polar liquid 16 toward the scanning electrode 6 in the pixel region PX1, which is to be scanned next, based on the table or the function stored in the memory (not shown). Similarly, the pre-signal determination portion 24 determines the amount of displacement of the polar liquid 16 toward the scanning electrode 6 in each of the pixel regions PX2 and PX3, which are to be scanned next. Thus, as shown in FIG. 16A, the amount of displacement of the polar liquid 16 from the initial position toward the scanning electrode 6 due to the first previous scanning operation is determined in each of the pixel regions PX1 to PX3.

Next, based on the operation signals in the scanning operation in the pixel region PX1 determined by the image processing portion 19, the pre-signal determination portion 24 recognizes a position (target position) to which the polar liquid 16 is to be moved in the pixel region PX1, calculates a difference with the amount of displacement determined, i.e., the amount by which the polar liquid 16 should be moved in the pixel region PX1 by the current scanning operation, and determines the voltage and the application time of the pre-signal to be applied to the signal electrode 4, the voltage and the application time of the pre-signal to be applied to the reference electrode 5, and the voltage and the application time of the pre-signal to be applied to the scanning electrode 6.

Specifically, as shown in FIGS. 15A to 15C, the pre-signal determination portion 24 defines a period between the time T9 and the time T10 as an application time of the selection time from the time T9 to the time T11 in the scanning operation. Moreover, the pre-signal determination portion 24 determines to apply the M voltage, the L voltage, and the H voltage as the pre-signals to the signal electrode 4, the reference electrode 5, and the scanning electrode 6, as shown in FIGS. 15A, 15B, and 15C, respectively. Thus, the polar liquid 16 in the pixel region PX1 is not moved, but held in the current position for the application time of the pre-signals from the time T9 to the time T10. Subsequently, in the pixel region PX1, the voltages in accordance with the instruction signals from the image processing portion 19 are applied to the signal electrode 4, the reference electrode 5, and the scanning electrode 6 for the writing time from the time T10 to the time T11. Thus, the polar liquid 16 in the pixel region PX1 is moved to the position where it is to be located in the current scanning operation.

Similarly, in each of the pixel regions PX2 and PX3, the amount by which the polar liquid 16 should be moved is calculated to determine the voltage and the application time of the pre-signal to be applied to the signal electrode 4, the voltage and the application time of the pre-signal to be applied to the reference electrode 5, and the voltage and the application time of the pre-signal to be applied to the scanning electrode 6. Thus, the polar liquid 16 in each of the pixel regions PX2 and PX3 is held in the current position for the application time of the pre-signals, and then is moved in accordance with the applied voltages during the writing time and reaches the position where it is to be located in the current scanning operation. Consequently, as shown in FIG. 16B, the polar liquid 16 in each of the pixel regions PX1 to PX3 is moved to the target position that is located on the left side at a distance "h" away from the right end in FIG. 16B.

On the other hand, when the scanning operation is performed without supplying the pre-signals after the polar liquid 16 in each of the pixel regions PX1 to PX3 has been moved toward the scanning electrode 6 due to the first previous scanning operation, as shown in FIG. 16C, the polar liquid 16 in each of the pixel regions PX1 to PX3 passes over the target position and is moved until it comes into contact with the right end, as shown in FIG. 16D. Consequently, a color shift from the desired color occurs, and the display quality is reduced.

With the above configuration, this embodiment can have effects comparable to those of Embodiment 1. In this embodiment, the display control DC supplies the predetermined pre-signals to the signal electrodes 4, the reference electrodes 5, and the scanning electrodes 6 so that the polar liquid 16 in each of a plurality of the pixel regions to be scanned is held on the initial position side for each pixel region when the scanning operation is performed. Thus, in this embodiment, the polar liquid 16 can be moved precisely in each of the pixel regions, and the display element 10 can have excellent display quality.

In this embodiment, the pre-signal determination portion 24 determines the amount of displacement of the polar liquid 16 due to the first previous scanning operation in each of the pixel regions to be scanned when the scanning operation is performed, and also uses the amount of displacement thus obtained to determine the voltage and the application time of the pre-signal to be applied to the signal electrodes 4, the voltage and application time of the pre-signal to be applied to the reference electrodes 5, and the voltage and the application time of the pre-signal to be applied to the scanning electrodes 6. Therefore, the polar liquid 16 can be moved more precisely toward the initial position, and a reduction in the display quality can be prevented more reliably even if the gradation display is performed.

In this embodiment, the pre-signal determination portion 24 uses the amount of displacement thus obtained to determine the voltage and the application time of the pre-signal to be applied to the signal electrodes 4, the voltage and the application time of the pre-signal to be applied to the reference electrodes 5, and the voltage and the application time of the pre-signal to be applied to the scanning electrodes 6 so that the polar liquid 16 in each of the pixel regions to be scanned is held in the current position when the scanning operation is performed. Thus, the voltages of the pre-signals can be applied during the scanning operation, and the polar liquid 16 is not moved by the pre-signals. Therefore, it is possible to significantly suppress the adverse effect on the adjacent pixel regions in which the scanning operation has already been performed. Consequently, the speed of the display operation can be easily improved, and the display element 10 with excellent display quality can be easily provided.

In the above description, as the predetermined pre-signals, the M voltage, the L voltage, and the H voltage are applied to the signal electrodes 4, the reference electrodes 5, and the scanning electrodes 6, respectively. However, the pre-signals of this embodiment are not limited thereto, as long as the polar liquid 16 in each of the pixel regions to be scanned is held in the current position when the scanning operation is performed. For example, the M voltage, the H voltage, and the L voltage may be applied to the signal electrodes 4, the reference electrodes 5, and the scanning electrodes 6, respectively.

In addition to the above description, the pre-signal determination portion 24 may use the amount of displacement to determine the voltages and the application time of the pre-signals that move the polar liquid 16 so as to be held on the initial position side.

Embodiment 4

Figure 17:
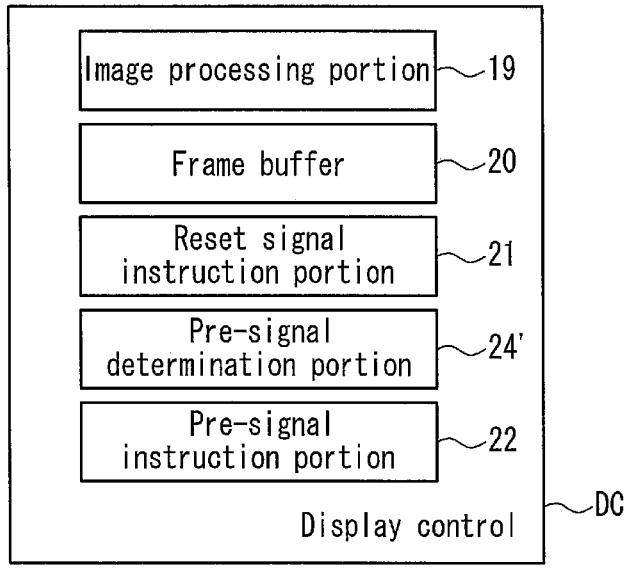
FIG. 17 is a block diagram showing the specific configuration of a display control of a display element of Embodiment 4 of the present invention.

FIG. 17 is a block diagram showing the specific configuration of a display control of a display element of Embodiment 4 of the present invention. In FIG. 14, this embodiment mainly differs from Embodiment 3 in that the pre-signal determination portion determines the amount of displacement of the polar liquid due to the first and second previous scanning operations. The same components as those of Embodiment 3 are denoted by the same reference numerals, and the explanation will not be repeated.

As shown in FIG. 17, the display control DC of this embodiment includes a pre-signal determination portion 24'. The pre-signal determination portion 24' is configured to determine the amount of displacement of the polar liquid 16 due to the first and second previous scanning operations in each of the pixel regions to be scanned by using a table or a function in a memory (not shown). The pre-signal determination portion 24' also uses the amount of displacement thus obtained to determine a voltage and an application time of the pre-signal to be applied to the signal electrodes 4, a voltage and an application time of the pre-signal to be applied to the reference electrodes 5, and a voltage and an application time of the pre-signal to be applied to the scanning electrodes 6.

Moreover, the pre-signal determination portion 24' uses the amount of displacement thus obtained to determine a voltage and an application time of the pre-signal to be applied to the signal electrodes 4, a voltage and an application time of the pre-signal to be applied to the reference electrodes 5, and a voltage and an application time of the pre-signal to be applied to the scanning electrodes 6 so that the polar liquid 16 in each of the pixel regions to be scanned is held in the current position when the scanning operation is performed. Thus, the pre-signals can be supplied within the selection time of the scanning operation, while the polar liquid 16 in each of the pixel regions to be scanned is not moved by the pre-signals.

Hereinafter, an operation example of the display element 10 of this embodiment will be described in detail with reference to FIG. 18. The following description is directed to the main operation process of the pre-signal determination portion 24'.

Figure 18:
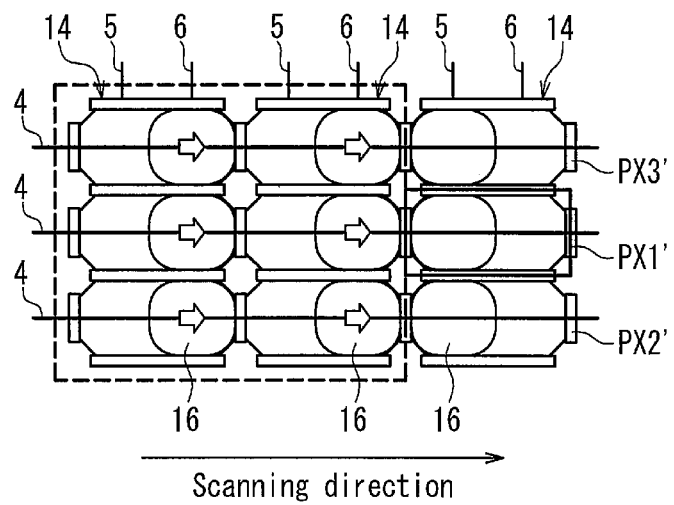
FIG. 18 is a diagram for explaining the main operation process in the pre-signal determination portion in FIG. 17.

FIG. 18 is a diagram for explaining the main operation process in the pre-signal determination portion in FIG. 17.

In FIG. 18, e.g., tests are performed using a real machine to determine the amount of displacement of the polar liquid 16 from the initial position in a pixel region PX1' by inputting various operation signals (i.e., the voltages applied to the corresponding signal electrodes 4, the corresponding reference electrodes 5, and the corresponding scanning electrodes 6) to six pixel regions for the first and second previous scanning operations (surrounded by a dotted line in FIG. 18) of the adjacent pixel regions of the pixel region PX1' to be measured. Then, the relationships between the operation signals input to the six pixel regions and the amount of displacement of the polar liquid 16 in the pixel region PX1' are represented by a table or a function beforehand. This process of representing the above relationships by a table or a function is also performed in the same manner on pixel regions PX2' and PX3'. Thus, the relationships between the operation signals and the amount of displacement in all the pixel regions within the display surface have been previously determined, represented by a table or a function, and stored in the memory.

Next, based on the operation signals in the scanning operation in the pixel region PX1' determined by the image processing portion 19, the pre-signal determination portion 24' recognizes a position (target position) to which the polar liquid 16 is to be moved in the pixel region PX1', calculates a difference with the amount of displacement determined, i.e., the amount by which the polar liquid 16 should be moved in the pixel region PX1' by the current scanning operation, and determines the voltage and the application time of the pre-signal to be applied to the signal electrode 4, the voltage and the application time of the pre-signal to be applied to the reference electrode 5, and the voltage and the application time of the pre-signal to be applied to the scanning electrode 6. Similarly, in each of the pixel regions PX2' and PX3', the amount by which the polar liquid 16 should be moved is calculated to determine the voltage and the application time of the pre-signal to be applied to the signal electrode 4, the voltage and the application time of the pre-signal to be applied to the reference electrode 5, and the voltage and the application time of the pre-signal to be applied to the scanning electrode 6.

With the above configuration, this embodiment can have effects comparable to those of Embodiment 3. In this embodiment, the amount of displacement of the polar liquid 16 due to the first and second previous scanning operations is determined. Therefore, the polar liquid 16 can be moved more precisely toward the initial position, and a reduction in the display quality can be prevented more reliably even if the gradation display is performed.

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion. However, the present invention is not limited thereto, as long as it is applied to an electric device with a display portion that displays the information including characters and images. For example, the present invention is suitable for various electric devices with display portions such as a personal digital assistant such as an electronic organizer, a display apparatus for a personal computer or television, and an electronic paper.

In the above description, the electrowetting type display element is used, in which the polar liquid is moved in accordance with the application of an electric field to the polar liquid. However, the display element of the present invention is not limited thereto, as long as it is an electric-field-induced display element that can change the display color on the display surface by moving the polar liquid in the display space with the use of an external electric field. For example, the present invention can be applied to other types of electric-field-induced display elements such as an electroosmotic type, an electrophoretic type, and a dielectrophoretic type.

As described in each of the above embodiments, the electrowetting type display element is preferred because the polar liquid can be moved at a high speed and a low drive voltage. In the electrowetting type display element, the display color is changed with the movement of the polar liquid. Therefore, unlike a liquid crystal display apparatus or the like using a birefringent material such as a liquid crystal layer, it is possible to easily provide a high brightness display element with excellent utilization efficiency of light from the backlight or ambient light used for information display. Moreover, since a switching device does not need to be provided for each pixel, a high-performance matrix-driven display element having a simple structure can be achieved at a low cost.

In the above description, the initial position is set on the effective display region side. However, the initial position of the present invention may be set on the effective display region side or the non-effective display region side that is opposite the scanning direction.

In the above description, the display control includes the image processing portion, the reset signal instruction portion, and the pre-signal instruction portion. However, the present invention is not limited to this configuration. For example, the image processing portion, the rest signal instruction portion, and the pre-signal instruction portion may be provided integrally. In addition to the above description, e.g., the placement of the signal voltage application portion, the reference voltage application portion, and the scanning voltage application portion can be eliminated, and the signal electrodes, the reference electrodes, and the scanning electrodes may be directly connected to the display control so that the display control supplies the corresponding voltages to those electrodes.

The above description refers to the transmission type display element including a backlight. However, the present invention is not limited thereto, and may be applied to a reflection type display element including a light reflection portion such as a diffuse reflection plate, a semi-transmission type display element including the light reflection portion along with a backlight, or the like.

In the above description, the polar liquid is a potassium chloride aqueous solution. However, the polar liquid of the present invention is not limited thereto. Specifically, the polar liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The polar liquid of the present invention also can be an ionic liquid (room temperature molten salt) including pyridine-, alicyclic amine-, or aliphatic amine-based cations and fluorine anions such as fluoride ions or triflate.

The polar liquid of the present invention includes a conductive liquid having conductivity and a high dielectric liquid with a relative dielectric constant of a predetermined value or more, and preferably 15 or more.

As described in each of the above embodiments, the aqueous solution in which a predetermined electrolyte is dissolved is preferred for the polar liquid because the display element can have excellent handling properties and also be easily produced.

In the above description, the nonpolar oil is used. However, the present invention is not limited thereto, as long as an insulating fluid that is not mixed with the polar liquid is used. For example, air may be used instead of the oil. Moreover, silicone oil or an aliphatic hydrocarbon also can be used as the oil. The insulating fluid of the present invention includes a fluid with a relative dielectric constant of a predetermined value or less, and preferably 5 or less.

As described in each of the above embodiments, the nonpolar oil that is not compatible with the polar liquid is preferred because the droplets of the polar liquid move more easily in the nonpolar oil compared to the use of air and the polar liquid. Consequently, the polar liquid can be moved at a high speed, and the display color can be switched at a high speed.

In the above description, the signal electrodes are provided on the upper substrate (first substrate) and the reference electrodes and the scanning electrodes are provided on the lower substrate (second substrate). However, the present invention is not limited thereto, and may have a configuration in which the signal electrodes are placed in the display space so as to come into contact with the polar liquid, and the reference electrodes and the scanning electrodes are provided on one of the first substrate and the second substrate so as to be electrically insulated from the polar liquid and each other. Specifically, e.g., the signal electrodes may be provided on the second substrate or on the ribs, and the reference electrodes and the scanning electrodes may be provided on the first substrate.

In the above description, the reference electrodes and the scanning electrodes are located on the effective display region side and the non-effective display region side, respectively. However, the present invention is not limited thereto, and the reference electrodes and the scanning electrodes may be located on the non-effective display region side and the effective display region side, respectively.

In the above description, the reference electrodes and the scanning electrodes are formed on the surface of the lower substrate (second substrate) that faces the display surface side. However, the present invention is not limited thereto, and can use the reference electrodes and the scanning electrodes that are buried in the second substrate made of an insulating material. In this case, the second substrate also can serve as a dielectric layer, which can eliminate the formation of the dielectric layer. Moreover, the signal electrodes may be directly provided on the first and second substrates serving as dielectric layers, and thus may be placed in the display space.

In the above description, the reference electrodes and the scanning electrodes are made of transparent electrode materials. However, the present invention is not limited thereto, as long as either one of the reference electrodes and the scanning electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the reference electrodes and the scanning electrodes are in the form of stripes. However, the shapes of the reference electrodes and the scanning electrodes of the present invention are not limited thereto. For example, the reflection type display element may use linear or mesh electrodes that are not likely to cause a light loss, since the utilization efficiency of light used for information display is lower in the reflection type display element than in the transmission type display element.

In the above description, the signal electrodes are linear wiring. However, the signal electrodes of the present invention are not limited thereto, and can be wiring with other shapes such as mesh wiring.

In the above description, the black colored polar liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the polar liquids that are colored different colors such as RGB, CMY composed of cyan (C), magenta (M), and yellow (Y), or RGBYC also can be used.

In the above description, the color filter layer is formed on the surface of the upper substrate (first substrate) that faces the non-display surface side. However, the present invention is not limited thereto, and the color filter layer may be formed on the surface of the first substrate that faces the display surface side or on the lower substrate (second substrate). Thus, the color filter layer is preferred compared to the use of the polar liquids with different colors because the display element can be easily produced. Moreover, the color filter layer is also preferred because the effective display region and the non-effective display region can be properly and reliably defined with respect to the display space by the color filter (aperture) and the black matrix (light-shielding layer) included in the color filter layer, respectively.

INDUSTRIAL APPLICABILITY

The present invention is useful for a display element that can prevent a reduction in the display quality even if the gradation display is performed, and an electric device using the display element.

DESCRIPTION OF REFERENCE NUMERALS

1 Image display apparatus (electric device)
2 Upper substrate (first substrate)
3 Lower substrate (second substrate)
4 Signal electrode
5 Reference electrode
6 Scanning electrode
7 Signal driver (signal voltage application portion)
8 Reference driver (reference voltage application portion)
9 Scanning driver (scanning voltage application portion)
10 Display element
11 Color filter layer
11r, 11g, 11b Color filter (aperture)
11s Black matrix (light-shielding layer)
13 Dielectric layer
16 Polar liquid
17 Oil (insulating fluid)
22 Pre-signal instruction portion
23 Pre-signal time setting portion
24, 24' Pre-signal determination portion
DC Display control
S Display space
P Pixel region
P1 Effective display region
P2 Non-effective display region

The invention claimed is:

1. A display element that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a polar liquid sealed in the display space so as to be moved toward the effective display region or the non-effective display region, and that is capable of changing a display color on the display surface side by moving the polar liquid, wherein the display element comprises:

a plurality of signal electrodes that are placed in the display space so as to come into contact with the polar liquid, and are also provided along a predetermined arrangement direction;

a plurality of reference electrodes that are provided on one of the first substrate and the second substrate so as to be electrically insulated from the polar liquid and to be located on one of the effective display region side and the non-effective display region side, and are also arranged so as to intersect with the plurality of the signal electrodes;

a plurality of scanning electrodes that are provided on one of the first substrate and the second substrate so as to be electrically insulated from the polar liquid and the plurality of the reference electrodes and to be located on the other of the effective display region side and the non-effective display region side, and are also arranged so as to intersect with the plurality of the signal electrodes;

a plurality of pixel regions that are located at each of the intersections of the plurality of the signal electrodes and the plurality of the scanning electrodes;

ribs that are provided on at least one of the first substrate and the second substrate so as to partition an inside of the display space in accordance with each of the plurality of the pixel regions;

an insulating fluid that is not mixed with the polar liquid and is movably sealed in the display space; and a display control that performs drive control of the plurality of the signal electrodes, the plurality of the reference electrodes, and the plurality of the scanning electrodes so that a scanning operation is performed along a predetermined scanning direction based on an external image input signal, wherein the effective display region and the non-effective display region are set along the scanning direction in each of the plurality of the pixel regions, wherein the display control supplies predetermined reset signals to the signal electrodes, the reference electrodes, and the scanning electrodes so that the polar liquid in each of all the pixel regions is moved to an initial position that is set on the effective display region side or the non-effective display region side opposite the scanning direction before the scanning operation is performed;

wherein the display control supplies predetermined pre-signals to the signal electrodes, the reference electrodes, and the scanning electrodes so that the polar liquid in each of the pixel regions to be scanned is held on the initial position side when the scanning operation is performed;

a signal voltage application portion that is connected to the plurality of the signal electrodes and the display control, and applies a signal voltage in a predetermined voltage range in accordance with information to be displayed on the display surface side, a voltage of the reset signal, and a voltage of the pre-signal to each of the plurality of the signal electrodes based on an instruction signal from the display control;

a reference voltage application portion that is connected to the plurality of the reference electrodes and the display control, and applies one of a selected voltage and a non-selected voltage, a voltage of the reset signal, and a voltage of the pre-signal to each of the plurality of the reference electrodes, the selected voltage allowing the polar liquid to move in the display space in accordance with the signal voltage and the non-selected voltage inhibiting movement of the polar liquid in the display space; and a scanning voltage application portion that is connected to the plurality of the scanning electrodes and the display control, and applies one of a selected voltage and a non-selected voltage, a voltage of the reset signal, and a voltage of the pre-signal to each of the plurality of the scanning electrodes, the selected voltage allowing the polar liquid to move in the display space in accordance with the signal voltage and the non-selected voltage inhibiting movement of the polar liquid in the display space.

2. The display element according to claim 1, wherein the display control includes a reset signal instruction portion that selects a maximum voltage or a minimum voltage of the signal voltage as a voltage of the reset signal to be applied to the signal electrodes, that selects the selected voltage or the non-selected voltage as a voltage of the reset signal to be applied to the reference electrodes, and that selects the selected voltage or the non-selected voltage as a voltage of the reset signal to be applied to the scanning electrodes.

3. The display element according to claim 1, wherein the display control supplies predetermined pre-signals to the signal electrodes, the reference electrodes, and the scanning electrodes so that the polar liquid in each of a plurality of the pixel regions to be scanned is held on the initial position side at the same time when the scanning operation is performed.

4. The display element according to claim 3, wherein the display control includes a pre-signal instruction portion that selects a maximum voltage or a minimum voltage of the signal voltage as a voltage of the pre-signal to be applied to the signal electrodes, that selects the selected voltage or the non-selected voltage as a voltage of the pre-signal to be applied to the reference electrodes, and that selects the selected voltage or the non-selected voltage as a voltage of the pre-signal to be applied to the scanning electrodes.

5. The display element according to claim 4, wherein the display control includes a pre-signal time setting portion for setting an application time of the pre-signals to the signal electrodes, the reference electrodes, and the scanning electrodes, and the pre-signal instruction portion uses the application time set by the pre-signal time setting portion to select a voltage of the pre-signal to be applied to the signal electrodes, a voltage of the pre-signal to be applied to the reference electrodes, and a voltage of the pre-signal to be applied to the scanning electrodes.

6. The display element according to claim 1, wherein the display control supplies predetermined pre-signals to the signal electrodes, the reference electrodes, and the scanning electrodes so that the polar liquid in each of a plurality of the pixel regions to be scanned is held on the initial position side for each pixel region when the scanning operation is performed.

7. The display element according to claim 6, wherein the display control includes a pre-signal determination portion that determines an amount of displacement of the polar liquid due to at least a first previous scanning operation in each of the pixel regions to be scanned when the scanning operation is performed, and that also uses the amount of displacement thus obtained to determine a voltage and an application time of the pre-signal to be applied to the signal electrodes, a voltage and an application time of the pre-signal to be applied to the reference electrodes, and a voltage and an application time of the pre-signal to be applied to the scanning electrodes.

8. The display element according to claim 7, wherein the pre-signal determination portion uses the amount of displacement thus obtained to determine a voltage and an application time of the pre-signal to be applied to the signal electrodes, a voltage and an application time of the pre-signal to be applied to the reference electrodes, and a voltage and an application time of the pre-signal to be applied to the scanning electrodes so that the polar liquid in each of the pixel regions to be scanned is held in a current position when the scanning operation is performed.

9. The display element according to claim 1, wherein the plurality of the pixel regions are provided in accordance with a plurality of colors that enable full-color display to be shown on the display surface side.

10. The display element according to claim 1, wherein a dielectric layer is formed on the surfaces of the plurality of the reference electrodes and the plurality of the scanning electrodes.

11. The display element according to claim 1, wherein the non-effective display region is defined by a light-shielding layer that is provided on one of the first substrate and the second substrate, and the effective display region is defined by an aperture formed in the light-shielding layer.

12. An electric device comprising a display portion that displays information including characters and images, wherein the display portion comprises the display element according to claim 1.

* * * * *